United States Patent
Joseph et al.

(10) Patent No.: US 11,653,317 B2
(45) Date of Patent: May 16, 2023

(54) WIRELESS COMMUNICATION ENHANCEMENTS FOR TRANSPARENT AND BOUNDARY CLOCKS

(71) Applicant: QUALCOMM Incorporated, San Diego, CA (US)

(72) Inventors: Vinay Joseph, Calicut (IN); Rajat Prakash, San Diego, CA (US); Peerapol Tinnakornsrisuphap, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/160,342

(22) Filed: Jan. 27, 2021

(65) Prior Publication Data

US 2021/0153148 A1    May 20, 2021

Related U.S. Application Data

(62) Division of application No. 16/792,133, filed on Feb. 14, 2020, now Pat. No. 11,228,994.

(Continued)

(51) Int. Cl.
*H04W 56/00* (2009.01)
*H04L 69/28* (2022.01)
*H04W 76/10* (2018.01)

(52) U.S. Cl.
CPC .......... *H04W 56/001* (2013.01); *H04L 69/28* (2013.01); *H04W 76/10* (2018.02)

(58) Field of Classification Search
CPC ........................ H04W 56/00; H04W 56/001
See application file for complete search history.

(56) References Cited

U.S. PATENT DOCUMENTS

| | | | |
|---|---|---|---|
| 2012/0300795 A1 | 11/2012 | Joergensen | |
| 2014/0177653 A1* | 6/2014 | Tzeng | H04J 3/0673 370/503 |

(Continued)

FOREIGN PATENT DOCUMENTS

| | | |
|---|---|---|
| EP | 2472916 A1 | 7/2012 |
| WO | WO-2020081060 A1 | 4/2020 |

OTHER PUBLICATIONS

Ericsson: "Clarification of 5G Clock in Relation to TSN Time Synchronization", 3GPP Draft, 3GPP TSG-SA WG2 Meeting #129BIS, S2-1812417 5GCLOCK in Timesync Solutions PA2, 3rd Generation Partnership Project (3GPP), Mobile Competence Centre, 650, Route Des Lucioles, F-06921, Sophia-Antipolis Cedex, France, vol. SA WG2, No. West Palm Beach, Florida; Nov. 26, 2018-Nov. 30, 2018, Nov. 20, 2018 (Nov. 20, 2018), XP051499120, 5 pages, Retrieved from the Internet: URL: http://www.3gpp.org/ftp/tsg%5Fsa/WG2%5FArch/TSGS2%5F129BIS%5FWest%5FPalm%5FBeach/Docs/S2%2D1812417%2Ezip [retrieved on Nov. 20, 2018] p. 1-p. 5 figures 6.11.1-1.1 figures 6.11.1-1.2.

(Continued)

*Primary Examiner* — Sulaiman Nooristany
(74) *Attorney, Agent, or Firm* — Holland & Hart LLP

(57) ABSTRACT

Methods, systems, and devices for wireless communications are described. In an example, a method includes a first node receiving a precision time protocol (PTP) message, identifying one or more timing domains to be supported by the first node based at least in part on the PTP message, and sending, to a second node of the wireless communication network, an indicator of the one or more timing domains to be supported by the first node. Another example at a node includes receiving, from additional nodes of the wireless communication network, indicators of one or more timing domains supported by the additional nodes, receiving a PTP message associated with a timing domain, and sending the (Continued)

PTP message to a subset of the additional nodes based at least in a part on the indicators of one or more timing domains supported by the additional nodes.

21 Claims, 26 Drawing Sheets

Related U.S. Application Data

(60) Provisional application No. 62/807,126, filed on Feb. 18, 2019.

(56) References Cited

U.S. PATENT DOCUMENTS

| | | | |
|---|---|---|---|
| 2015/0222413 | A1 | 8/2015 | Pietilainen |
| 2019/0207862 | A1* | 7/2019 | Kajio .................... H04L 7/0008 |
| 2020/0267673 | A1 | 8/2020 | Joesph |
| 2021/0359778 | A1* | 11/2021 | Wang .................... H04J 3/0667 |

OTHER PUBLICATIONS

International Search Report and Written Opinion—PCT/US2020/018484—ISA/EPO—dated Dec. 3, 2020.

Ericsson: "Clarification of Option #1 Transparent Time Synchronization", 3GPP Draft, 3GPP TSG-SA WG2 Meeting #129BIS, S2-1812420_TSN SOLN#11Transparent Timesync_PA4, 3rd Generation Partnership Project (3GPP), Mobile Competence Centre, 650, Route Des Lucioles, F-06921, Sophia-Antipolis Cedex, France, vol. SA WG2, No. West Palm Beach, Florida; Nov. 26, 2018-Nov. 30, 2018, Nov. 20, 2018 (Nov. 20, 2018), XP051499123, 4 pages, Retrieved from the Internet: URL: http://www.3gpp.org/ftp/tsg%5Fsa/WG2%5FArch/TSGS2%5F129BIS%5FWest%5FPalm%5FBeach/Docs/S2%2D1812420%2Ezip [retrieved on Nov. 20, 2018] the whole document.

International Search Report and Written Opinion—PCT/US2020/018484—ISAEPO—dated Aug. 3, 2020.

Partial International Search Report—PCT/US2020/018484—ISA/EPO—dated Jun. 9, 2020.

* cited by examiner

WIRELESS COMMUNICATION ENHANCEMENTS FOR TRANSPARENT AND BOUNDARY CLOCKS

CROSS REFERENCE

The present application for patent is a Divisional of U.S. patent application Ser. No. 16/792,133 by JOSEPH et al., entitled "WIRELESS COMMUNICATION ENHANCEMENTS FOR TRANSPARENT AND BOUNDARY CLOCKS" filed Feb. 14, 2020, which claims the benefit of U.S. Provisional Patent Application No. 62/807,126 by JOSEPH et al., entitled "WIRELESS COMMUNICATION ENHANCEMENTS FOR TRANSPARENT AND BOUNDARY CLOCKS," filed Feb. 18, 2019, assigned to the assignee hereof, and expressly incorporated herein.

BACKGROUND

The following relates generally to wireless communication enhancements for transparent and boundary clocks in wireless communications systems.

Wireless communication networks are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some networks or systems may employ time-sensitive operations. For example, Industrial Internet of Things (IIoT) networks may implement complex interactions between different machines (e.g., robots, conveyors, etc.) for manufacturing. Time synchronization techniques may be used to synchronize clocks among components of the network and to convey ingress times for received packets. Some networks may use messages, such as Precision Time Protocol (PTP) messages, for informing nodes of the network of information related to timing. However, employing a wireless communication network in these types of systems for distributing communications between network nodes may provide challenges in maintaining timing synchronization.

SUMMARY

The described techniques relate to improved methods, systems, devices, and apparatuses that support wireless communication enhancements for transparent and boundary clocks. Generally, the described techniques provide for improvements to time-sensitive network operations. Time synchronization techniques may be used to synchronize clocks among various components of the network and to convey ingress times for when packets and frames are received. Some networks may use messages, such as Precision Time Protocol (PTP) messages, for informing network nodes of information related to timing. Different techniques may be used for when a network node functions according to different timing mechanisms (e.g., functioning as a transparent clock or a boundary clock). Link delays may be signaled and corrected for where relevant. A node may be informed of when to look for PTP messages. Techniques described herein further include selecting timing domains and providing indications to nodes of the selected timing domains.

A method at a first node of a wireless communication network. The method may include receiving a first ethernet frame including a PTP message, determining an ingress time for the PTP message received at the first node, generating a packet data unit (PDU) for transmission to a second node of the wireless communication network based on the first ethernet frame by overwriting a field in the PTP message with a value corresponding to the ingress time for the PTP message, and sending the PDU to the second node.

An apparatus is described. The apparatus may include a processor, memory coupled to processor, and instructions stored in the memory. The instructions may be executable by the processor to cause the apparatus to receive a first ethernet frame including a PTP message, determine an ingress time for the PTP message received at the first node, generate a PDU for transmission to a second node of the wireless communication network based on the first ethernet frame by overwriting a field in the PTP message with a value corresponding to the ingress time for the PTP message, and send the PDU to the second node.

Another apparatus is described. The apparatus may include means for receiving a first ethernet frame including a PTP message, means for determining an ingress time for the PTP message received at the first node, generating a PDU for transmission to a second node of the wireless communication network based on the first ethernet frame by overwriting a field in the PTP message with a value corresponding to the ingress time for the PTP message, and means for sending the PDU to the second node.

A non-transitory computer-readable medium storing code is described. The code may include instructions executable by a processor to receive a first ethernet frame including a PTP message, determine an ingress time for the PTP message received at the first node, generate a PDU for transmission to a second node of the wireless communication network based on the first ethernet frame by overwriting a field in the PTP message with a value corresponding to the ingress time for the PTP message, and send the PDU to the second node.

In some examples of the method, apparatuses, and non-transitory computer-readable medium described herein, the PTP message may be a Sync message or a Follow_Up message. In an example where the PTP message is a Sync message, the method, apparatuses, and non-transitory computer-readable medium may also include generating the PDU for transmission may further include operations, features, means, or instructions for overwriting a timestamp field of the Sync PTP message with the value corresponding to the ingress time. In other examples, generating the PDU for transmission may further include operations, features, means, or instructions for overwriting a field of a header of the Sync PTP message with the value corresponding to the ingress time.

In some examples of the method, apparatuses, and non-transitory computer-readable medium described herein, generating the PDU for transmission may further include operations, features, means, or instructions for overwriting a type linked value (TLV) of the PTP message with the value corresponding to the ingress time.

In some examples of the method, apparatuses, and non-transitory computer-readable medium described herein, generating the PDU may further include operations, features, means, or instructions for adjusting the ingress time for the PTP message to account for a link delay associated with the PTP message.

Some examples of the method, apparatuses, and non-transitory computer-readable medium described herein may further include operations, features, means, or instructions for providing an indication to the second node that an associated PDU session may carry PTP messages.

Some examples of the method, apparatuses, and non-transitory computer-readable medium described herein may further include operations, features, means, or instructions for signaling that the first node can filter sync messages associated with the PTP message.

The first node may be one of a user equipment (UE), a user plane function (UPF), or an adaptor connected to a UE or UPF. In some examples, generating the PDU further includes adjusting the ingress time for the PTP message to account for a link delay associated with the PTP message.

Another method at a first node of a wireless communication network is described. The method may include receiving, from a second node of the wireless communication network, a PDU including a PTP message, determining an ingress time for the PTP message for the wireless communication network from a field in the PTP message overwritten with a value corresponding to the ingress time for the PTP message, and determining an adjustment for a timing parameter associated with the PTP message based on the ingress time.

An apparatus is described. The apparatus may include a processor, memory coupled to processor, and instructions stored in the memory. The instructions may be executable by the processor to cause the apparatus to receive, from a second node of the wireless communication network, a PDU including a PTP message, determine an ingress time for the PTP message for the wireless communication network from a field in the PTP message overwritten with a value corresponding to the ingress time for the PTP message, and determine an adjustment for a timing parameter associated with the PTP message based on the ingress time.

Another apparatus is described. The apparatus may include means for receiving, from a second node of the wireless communication network, a PDU including a PTP message, means for determining an ingress time for the PTP message for the wireless communication network from a field in the PTP message overwritten with a value corresponding to the ingress time for the PTP message, and means for determining an adjustment for a timing parameter associated with the PTP message based on the ingress time.

A non-transitory computer-readable medium storing code is described. The code may include instructions executable by a processor to receive, from a second node of the wireless communication network, a PDU including a PTP message, determine an ingress time for the PTP message for the wireless communication network from a field in the PTP message overwritten with a value corresponding to the ingress time for the PTP message, and determine an adjustment for a timing parameter associated with the PTP message based on the ingress time.

Some examples of the method, apparatuses, and non-transitory computer-readable medium described herein may further include operations, features, means, or instructions for determining an egress time for a second ethernet frame including the PTP message from the first node, determining a residence time correction for the ethernet frame including the PTP message time by subtracting the ingress time from the egress time, and transmitting the second ethernet frame to a time sensitive network, where the second ethernet frame includes a modified version of the PTP message.

Some examples of the method, apparatuses, and non-transitory computer-readable medium described herein may further include operations, features, means, or instructions for adjusting the modified version of the PTP message by setting the overwritten field in the PTP message to a configured value.

Some examples of the method, apparatuses, and non-transitory computer-readable medium described herein may further include operations, features, means, or instructions for transmitting the second ethernet frame to a time sensitive network, where a correction field of the modified version of the PTP message may be adjusted by the residence time correction.

The first node may be one of a UE, UPF, or an adaptor connected to a UE or UPF.

Some examples of the method, apparatuses, and non-transitory computer-readable medium described herein may further include operations, features, means, or instructions for receiving an indication that a PDU session associated with the PTP message carries PTP messages.

A method at a first node of a wireless communication network is described. The method may include receiving a frame including a PTP message. The method may also include transmitting, to a second node of the wireless communication network, a session connectivity message associated with a PDU session for conveying the frame, the session connectivity message including an indicator that the PDU session supports PTP messages. The method may also include sending, to the second node, a PDU including the PTP message.

An apparatus is described. The apparatus may include a processor, memory coupled to processor, and instructions stored in the memory. The instructions may be executable by the processor to cause the apparatus to receive a frame including a PTP message. The instructions may be executable by the processor to further cause the apparatus to transmit, to a second node of the wireless communication network, a session connectivity message associated with a PDU session for conveying the frame, the session connectivity message including an indicator that the PDU session supports PTP messages and send, to the second node, a PDU including the PTP message.

Another apparatus is described. The apparatus may include means for receiving a frame including a PTP message, means for transmitting, to a second node of the wireless communication network, a session connectivity message associated with a PDU session for conveying the frame, the session connectivity message including an indicator that the PDU session supports PTP messages, and means for sending, to the second node, a PDU including the PTP message.

A non-transitory computer-readable medium storing code is described. The code may include instructions executable by a processor to receive a frame including a PTP message, transmit, to a second node of the wireless communication network, a session connectivity message associated with a PDU session for conveying the frame, the session connectivity message including an indicator that the PDU session supports PTP messages, and send, to the second node, a PDU including the PTP message.

Some examples of the method, apparatuses, and non-transitory computer-readable medium described herein may further include operations, features, means, or instructions for determining an ingress time for the PTP message, and generating the PDU by inserting a value corresponding to the ingress time for the PTP message.

Another method at a first node of a wireless communication network is described. The method may include receiving, from a second node of the wireless communication network, a session connectivity message associated with a PDU session, the session connectivity message including an indicator that the PDU session supports PTP messages, monitoring one or more PDUs received from the second node for PTP messages based on the indicator that the PDU session supports PTP messages, and identifying a PTP message in a PDU of the one or more PDUs based on the monitoring.

An apparatus is described. The apparatus may include a processor, memory coupled to processor, and instructions stored in the memory. The instructions may be executable by the processor to cause the apparatus to receive, from a second node of the wireless communication network, a session connectivity message associated with a PDU session, the session connectivity message including an indicator that the PDU session supports PTP messages, monitor one or more PDUs received from the second node for PTP messages based on the indicator that the PDU session supports PTP messages, and identify a PTP message in a PDU of the one or more PDUs based on the monitoring.

Another apparatus is described. The apparatus may include means for receiving, from a second node of the wireless communication network, a session connectivity message associated with a PDU session, the session connectivity message including an indicator that the PDU session supports PTP messages, means for monitoring one or more PDUs received from the second node for PTP messages based on the indicator that the PDU session supports PTP messages, and means for identifying a PTP message in a PDU of the one or more PDUs based on the monitoring.

A non-transitory computer-readable medium storing code is described. The code may include instructions executable by a processor to receive, from a second node of the wireless communication network, a session connectivity message associated with a PDU session, the session connectivity message including an indicator that the PDU session supports PTP messages, monitor one or more PDUs received from the second node for PTP messages based on the indicator that the PDU session supports PTP messages, and identify a PTP message in a PDU of the one or more PDUs based on the monitoring.

Some examples of the method, apparatuses, and non-transitory computer-readable medium described herein may further include operations, features, means, or instructions for determining an ingress time for the PTP message for the wireless communication network from a value corresponding to the ingress time for the PTP message inserted in the PDU, and adjusting a timing parameter associated with the PTP message based on the ingress time.

Another method at a first node of a wireless communication network is described. The method may include receiving, at a first node of a wireless communication network, a first ethernet frame including a first PTP message, determining an ingress time for the first PTP message received at the first node, receiving a second ethernet frame including a second PTP message associated with the first PTP message, generating a PDU for transmission to a second node of the wireless communication network based on the second ethernet frame, the PDU including a value corresponding to the ingress time for the first PTP message, and transmitting the PDU to the second node.

An apparatus is described. The apparatus may include a processor, memory coupled to processor, and instructions stored in the memory. The instructions may be executable by the processor to cause the apparatus to receive, at a first node of a wireless communication network, a first ethernet frame including a first PTP message, determine an ingress time for the first PTP message received at the first node, receive a second ethernet frame including a second PTP message associated with the first PTP message, generate a PDU for transmission to a second node of the wireless communication network based on the second ethernet frame, the PDU including a value corresponding to the ingress time for the first PTP message, and transmit the PDU to the second node.

Another apparatus is described. The apparatus may include means for receiving, at a first node of a wireless communication network, a first ethernet frame including a first PTP message, means for determining an ingress time for the first PTP message received at the first node, and means for receiving a second ethernet frame including a second PTP message associated with the first PTP message. The apparatus may also include means for generating a PDU for transmission to a second node of the wireless communication network based on the second ethernet frame, the PDU including a value corresponding to the ingress time for the first PTP message and means for transmitting the PDU to the second node.

A non-transitory computer-readable medium storing code is described. The code may include instructions executable by a processor to receive, at a first node of a wireless communication network, a first ethernet frame including a first PTP message, determine an ingress time for the first PTP message received at the first node, receive a second ethernet frame including a second PTP message associated with the first PTP message, generate a PDU for transmission to a second node of the wireless communication network based on the second ethernet frame, the PDU including a value corresponding to the ingress time for the first PTP message, and transmit the PDU to the second node.

In some examples of the method, apparatuses, and non-transitory computer-readable medium described herein, generating the PDU for transmission may include operations, features, means, or instructions for appending the value corresponding to the ingress time for the first PTP message to the second ethernet frame in the PDU.

In some examples of the method, apparatuses, and non-transitory computer-readable medium described herein, generating the PDU for transmission may further include operations, features, means, or instructions for modifying the second ethernet frame by overwriting a timestamp field of the second PTP message with the value corresponding to the ingress time.

In some examples of the method, apparatuses, and non-transitory computer-readable medium described herein, generating the PDU for transmission may further include operations, features, means, or instructions for modifying the second ethernet frame by overwriting a field of a header of the second PTP message with the value corresponding to the ingress time.

In some examples of the method, apparatuses, and non-transitory computer-readable medium described herein, where generating the PDU may further include operations, features, means, or instructions for modifying the second ethernet frame by overwriting a TLV of the second PTP message with the value corresponding to the ingress time.

In some examples of the method, apparatuses, and non-transitory computer-readable medium described herein, generating the PDU may further include operations, features, means, or instructions for adjusting the ingress time for the PTP message to account for a link delay associated with the PTP message.

Some examples of the method, apparatuses, and non-transitory computer-readable medium described herein may further include operations, features, means, or instructions for providing an indication to the second node that an associated PDU session may carry PTP messages.

Some examples of the method, apparatuses, and non-transitory computer-readable medium described herein may further include operations, features, means, or instructions for suppressing transmission of the first PTP message to the second node.

Some examples of the method, apparatuses, and non-transitory computer-readable medium described herein may further include operations, features, means, or instructions for receiving an indicator of support of the second node for suppressing transmission of the first PTP message to the second node. In some examples, the indicator is associated with a PDU session associated with the first and second PTP messages. The indicator may be associated with the PDU.

Some examples of the method, apparatuses, and non-transitory computer-readable medium described herein may further include operations, features, means, or instructions for signaling that the first node can filter sync messages associated with the PTP message.

A method at a first node of a wireless communication network is described. The method may include receiving, from a second node of the wireless communication network, a PDU associated with first and second ethernet frames received at the second node, the first ethernet frame including a first PTP message, and the second ethernet frame including a second PTP message, determining an ingress time for the first PTP message received at the second node based on the PDU, and determining an adjustment for a timing parameter of the second PTP message based on the ingress time.

An apparatus is described. The apparatus may include a processor, memory coupled to processor, and instructions stored in the memory. The instructions may be executable by the processor to cause the apparatus to receive, from a second node of the wireless communication network, a PDU associated with first and second ethernet frames received at the second node, the first ethernet frame including a first PTP message, and the second ethernet frame including a second PTP message, determine an ingress time for the first PTP message received at the second node based on the PDU, and determine an adjustment for a timing parameter of the second PTP message based on the ingress time.

Another apparatus is described. The apparatus may include means for receiving, from a second node of the wireless communication network, a PDU associated with first and second ethernet frames received at the second node, the first ethernet frame including a first PTP message, and the second ethernet frame including a second PTP message. The apparatus may also include means for determining an ingress time for the first PTP message received at the second node based on the PDU means for and determining an adjustment for a timing parameter of the second PTP message based on the ingress time.

A non-transitory computer-readable medium storing code is described. The code may include instructions executable by a processor to receive, from a second node of the wireless communication network, a PDU associated with first and second ethernet frames received at the second node, the first ethernet frame including a first PTP message, and the second ethernet frame including a second PTP message, determine an ingress time for the first PTP message received at the second node based on the PDU, and determine an adjustment for a timing parameter of the second PTP message based on the ingress time.

Some examples of the method, apparatuses, and non-transitory computer-readable medium described herein may further include operations, features, means, or instructions for determining an egress time for a third ethernet frame including a modified version of the first PTP message, and determining a residence time correction for the modified version of the first PTP message time by subtracting the ingress time from the egress time.

Some examples of the method, apparatuses, and non-transitory computer-readable medium described herein may further include operations, features, means, or instructions for transmitting the third ethernet frame and a fourth ethernet frame including a modified version of the second PTP message that identifies an adjustment to a time sensitive network, where a correction field of the modified version of the second PTP message may be modified using the residence time correction.

In some examples, determining the ingress time comprises one of identifying a value corresponding to the ingress time for the first PTP message from an overwritten field of the second PTP message or identifying one or more octets corresponding to the ingress time in the PDU.

Some examples of the method, apparatuses, and non-transitory computer-readable medium described herein may further include operations, features, means, or instructions for receiving an indication that a PDU session associated with the first and second PTP messages supports PTP messages.

In some examples of the method, apparatuses, and non-transitory computer-readable medium described herein, determining the adjustment may further include operations, features, means, or instructions for adjusting the modified version of the second PTP message by setting the overwritten field in the PTP message to a configured value.

Another method at a first node of a wireless communication network is described. The method may include receiving, from a time sensitive network, an ethernet frame including a PTP message, determining a link delay time for the PTP message between transmission from the time sensitive network and reception by the first node, generating a PDU for transmission to a second node of the wireless communication network based on adjusting a field of the PTP message according to a link delay, and transmitting the PDU to the second node.

An apparatus is described. The apparatus may include a processor, memory coupled to processor, and instructions stored in the memory. The instructions may be executable by the processor to cause the apparatus to receive, from a time sensitive network, an ethernet frame including a PTP message, determine a link delay time for the PTP message between transmission from the time sensitive network and reception by the first node, generate a PDU for transmission to a second node of the wireless communication network based on adjusting a field of the PTP message according to a link delay, and transmit the PDU to the second node.

Another apparatus is described. The apparatus may include means for receiving, from a time sensitive network, an ethernet frame including a PTP message, means for determining a link delay time for the PTP message between transmission from the time sensitive network and reception by the first node, means for generating a PDU for transmission to a second node of the wireless communication network based on adjusting a field of the PTP message according to a link delay, and means for transmitting the PDU to the second node.

A non-transitory computer-readable medium storing code is described. The code may include instructions executable by a processor to receive, from a time sensitive network, an ethernet frame including a PTP message, determine a link delay time for the PTP message between transmission from the time sensitive network and reception by the first node, generate a PDU for transmission to a second node of the wireless communication network based on adjusting a field of the PTP message according to a link delay, and transmit the PDU to the second node.

In some examples, the PTP message is one of a Sync message or a Follow_Up message. In some examples, the first node is one of a UE, a UPF, or an adaptor connected to a UE or UPF.

Another method at a first node of a wireless communication network is described. The method may include receiving a PTP message, identifying one or more relevant timing domains for the wireless communication network based on the PTP message, and maintaining a boundary clock for each of the one or more timing domains.

An apparatus is described. The apparatus may include a processor, memory coupled to processor, and instructions stored in the memory. The instructions may be executable by the processor to cause the apparatus to receive a PTP message, identify one or more relevant timing domains for the wireless communication network based on the PTP message, and maintain a boundary clock for each of the one or more timing domains.

Another apparatus is described. The apparatus may include means for receiving a PTP message, means for identifying one or more relevant timing domains for the wireless communication network based on the PTP message, and means for maintaining a boundary clock for each of the one or more timing domains.

A non-transitory computer-readable medium storing code is described. The code may include instructions executable by a processor to receive a PTP message, identify one or more relevant timing domains for the wireless communication network based on the PTP message, and maintain a boundary clock for each of the one or more timing domains.

Some examples of the method, apparatuses, and non-transitory computer-readable medium described herein may further include operations, features, means, or instructions for identifying a network tag in a frame associated with the PTP message, where identifying the one or more timing domains may be further based on the network tag.

Some examples of the method, apparatuses, and non-transitory computer-readable medium described herein may further include operations, features, means, or instructions for receiving, from the second node, timing information for the one or more timing domains.

Some examples of the method, apparatuses, and non-transitory computer-readable medium described herein may further include operations, features, means, or instructions for transmitting, to a second node of the wireless communication network, an indicator of the one or more timing domains supported by the first node.

In some examples, the timing information is received via broadcast signaling of a serving cell or via a unicast message from the serving cell.

Some examples of the method, apparatuses, and non-transitory computer-readable medium described herein may further include operations, features, means, or instructions for sending a second PTP message to a node of a time sensitive network associated with a timing domain of the one or more timing domains based on the respective boundary clock associated with the timing domain. In some examples, sending the second PTP message comprises sending an ethernet frame comprising a network tag associated with the timing domain.

Some examples of the method, apparatuses, and non-transitory computer-readable medium described herein may further include operations, features, means, or instructions for removing a timing domain from the one or more timing domains based on the PTP message.

A method at a first node of a wireless communication network is described. The method may include receiving, from one or more UEs served by the first node, an indicator of one or more timing domains to be supported by the one or more UEs and transmitting, for each timing domain of the one or more timing domains, an identifier of the timing domain and timing information associated with the timing domain.

An apparatus is described. The apparatus may include a processor, memory coupled to processor, and instructions stored in the memory. The instructions may be executable by the processor to cause the apparatus to receive, from one or more UEs served by the first node, an indicator of one or more timing domains to be supported by the one or more UEs and transmit, for each timing domain of the one or more timing domains, an identifier of the timing domain and timing information associated with the timing domain.

Another apparatus is described. The apparatus may include means for receiving, from one or more UEs served by the first node, an indicator of one or more timing domains to be supported by the one or more UEs and means for transmitting, for each timing domain of the one or more timing domains, an identifier of the timing domain and timing information associated with the timing domain.

A non-transitory computer-readable medium storing code is described. The code may include instructions executable by a processor to receive, from one or more UEs served by the first node, an indicator of one or more timing domains to be supported by the one or more UEs and transmit, for each timing domain of the one or more timing domains, an identifier of the timing domain and timing information associated with the timing domain.

Some examples of the method, apparatuses, and non-transitory computer-readable medium described herein may further include operations, features, means, or instructions for identifying a network tag associated with the timing domain in a frame associated with the PTP message, where identifying the one or more timing domains based on the network tag.

Some examples of the method, apparatuses, and non-transitory computer-readable medium described herein may further include operations, features, means, or instructions for transmitting, to a second node of the wireless communication network, an indicator of the network tag with the identifier of the timing domain.

Some examples may include that the timing information is transmitted via broadcast signaling or via a unicast message to the one or more UEs.

Some examples of the method, apparatuses, and non-transitory computer-readable medium described herein may further include operations, features, means, or instructions for removing a timing domain from the one or more timing domains based on the PTP message.

A method at a first node of a wireless communication network is described. The method may include receiving, from a second node of the wireless communication network, an indicator of one or more supported timing domains.

An apparatus is described. The apparatus may include a processor, memory coupled to processor, and instructions stored in the memory. The instructions may be executable by the processor to cause the apparatus to receive, from a second node of the wireless communication network, an indicator of one or more supported timing domains.

Another apparatus is described. The apparatus may include means for receiving, from a second node of the wireless communication network, an indicator of one or more supported timing domains.

A non-transitory computer-readable medium storing code is described. The code may include instructions executable by a processor to receive, from a second node of the wireless communication network, an indicator of one or more supported timing domains.

In some examples of the method, apparatuses, and non-transitory computer-readable medium, the indicator of the one or more supported timing domains indicates support for the supported timing domain at the second node or at a third node.

Some examples of the method, apparatuses, and non-transitory computer-readable medium described herein may further include operations, features, means, or instructions for receiving a first ethernet frame including a PTP message, identifying a timing domain associated with the PTP message, and sending a PDU to the third node including a modified version of the PTP message based on the timing domain being one of the one or more timing domains.

Some examples of the method, apparatuses, and non-transitory computer-readable medium described herein may further include operations, features, means, or instructions for identifying a network tag in the ethernet frame, where identifying the timing domain associated with the PTP message may be further based on the network tag.

A method at a first node of a wireless communication network is described. The method may include receiving a PTP message, identifying one or more timing domains to be supported by the first node based on the PTP message, and sending, to a second node of the wireless communication network, an indicator of the one or more timing domains to be supported by the first node.

An apparatus at a first node of a wireless communication network is described. The apparatus may include a processor, memory coupled to processor, and instructions stored in the memory. The instructions may be executable by the processor to cause the apparatus to receive a PTP message, identify one or more timing domains to be supported by the first node based on the PTP message, and send, to a second node of the wireless communication network, an indicator of the one or more timing domains to be supported by the first node.

Another apparatus at a first node of a wireless communication network is described. The apparatus may include means for receiving a PTP message, identifying one or more timing domains to be supported by the first node based on the PTP message, and sending, to a second node of the wireless communication network, an indicator of the one or more timing domains to be supported by the first node.

A non-transitory computer-readable medium storing code at a first node of a wireless communication network is described. The code may include instructions executable by a processor to receive a PTP message, identify one or more timing domains to be supported by the first node based on the PTP message, and send, to a second node of the wireless communication network, an indicator of the one or more timing domains to be supported by the first node.

In some examples of the method, apparatuses, and non-transitory computer-readable medium described herein, identifying the one or more timing domains further may include operations, features, means, or instructions for identifying a network tag in a frame associated with the PTP message.

In some examples of the method, apparatuses, and non-transitory computer-readable medium described herein, identifying the one or more timing domains further may include operations, features, means, or instructions for determining the one or more timing domains from a field in a header of the PTP.

A method at a first node of a wireless communication network is described. The method may include receiving a PTP message associated with a destination, where a second node of the wireless communication network serves as a packet gateway for the destination for the wireless communication network, and sending a representation of the PTP message to a third node of the wireless communications network.

An apparatus at a first node of a wireless communication network is described. The apparatus may include a processor, memory coupled to processor, and instructions stored in the memory. The instructions may be executable by the processor to cause the apparatus to receive a PTP message associated with a destination, where a second node of the wireless communication network serves as a packet gateway for the destination for the wireless communication network, send the PTP message to the second node, and send a representation of the PTP message to a third node of the wireless communications network.

Another apparatus at a first node of a wireless communication network is described. The apparatus may include means for receiving a PTP message associated with a destination, where a second node of the wireless communication network serves as a packet gateway for the destination for the wireless communication network, sending the PTP message to the second node, and sending a representation of the PTP message to a third node of the wireless communications network.

A non-transitory computer-readable medium storing code at a first node of a wireless communication network is described. The code may include instructions executable by a processor to receive a PTP message associated with a destination, where a second node of the wireless communication network serves as a packet gateway for the destination for the wireless communication network, send the PTP message to the second node, and send a representation of the PTP message to a third node of the wireless communications network.

In some examples of the method, apparatuses, and non-transitory computer-readable medium described herein the third node is one of an access and mobility management function (AMF), a UPF, or a base station. Some examples of the method, apparatuses, and non-transitory computer-readable medium described herein may further include operations, features, means, or instructions for sending the PTP message to the second node. In some examples of the method, apparatuses, and non-transitory computer-readable medium described herein a destination of the representation of the PTP message comprises a fourth node of the wireless communication network A method at a node of a wireless communication network is described. The method may include receiving, from additional nodes of the wireless communication network, indicators of one or more timing domains supported by the additional nodes, receiving a PTP message associated with a timing domain, and sending the PTP message to a subset of the additional nodes based at least in a part on the indicators of one or more timing domains supported by the additional nodes.

An apparatus at a node of a wireless communication network is described. The apparatus may include a processor, memory coupled to processor, and instructions stored in the memory. The instructions may be executable by the processor to cause the apparatus to receive, from additional nodes of the wireless communication network, indicators of one or more timing domains supported by the additional nodes, receive a PTP message associated with a timing domain, and send the PTP message to a subset of the additional nodes based at least in a part on the indicators of one or more timing domains supported by the additional nodes.

Another apparatus at a node of a wireless communication network is described. The apparatus may include means for receiving, from additional nodes of the wireless communication network, indicators of one or more timing domains supported by the additional nodes, receiving a PTP message associated with a timing domain, and sending the PTP message to a subset of the additional nodes based at least in a part on the indicators of one or more timing domains supported by the additional nodes.

A non-transitory computer-readable medium storing code at a node of a wireless communication network is described. The code may include instructions executable by a processor to receive, from additional nodes of the wireless communication network, indicators of one or more timing domains supported by the additional nodes, receive a PTP message associated with a timing domain, and send the PTP message to a subset of the additional nodes based at least in a part on the indicators of one or more timing domains supported by the additional nodes.

A method at a first node of a wireless communication network is described. The method may include identifying, for a PDU session with a second node of the wireless communication network, that the PDU session supports PTP messages and sending, to the second node of the wireless communication network, an indicator of the support of PTP messages for the PDU session.

An apparatus at a first node of a wireless communication network is described. The apparatus may include a processor, memory coupled to processor, and instructions stored in the memory. The instructions may be executable by the processor to cause the apparatus to identify, for a PDU session with a second node of the wireless communication network, that the PDU session supports PTP messages and send, to the second node of the wireless communication network, an indicator of the support of PTP messages for the PDU session.

Another apparatus at a first node of a wireless communication network is described. The apparatus may include means for identifying, for a PDU session with a second node of the wireless communication network, that the PDU session supports PTP messages and sending, to the second node of the wireless communication network, an indicator of the support of PTP messages for the PDU session.

A non-transitory computer-readable medium storing code at a first node of a wireless communication network is described. The code may include instructions executable by a processor to identify, for a PDU session with a second node of the wireless communication network, that the PDU session supports PTP messages and send, to the second node of the wireless communication network, an indicator of the support of PTP messages for the PDU session.

Some examples of the method, apparatuses, and non-transitory computer-readable medium described herein may further include operations, features, means, or instructions for receiving a message from a third node, and determining that the PDU session supports PTP messages based on the message from the third node.

DETAILED DESCRIPTION

Figure 1:
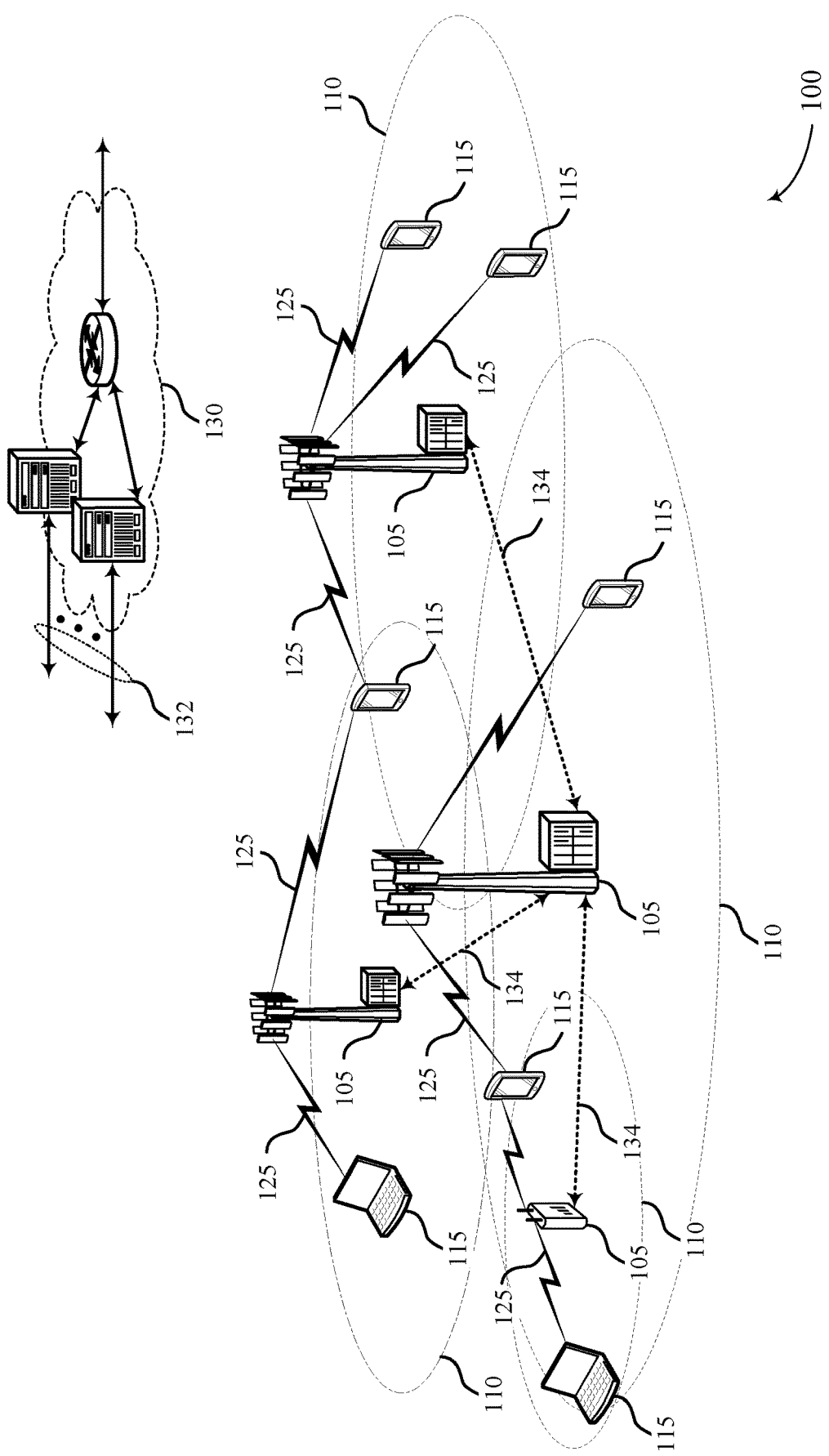
FIG. 1 illustrates an example of a system for wireless communications that supports wireless communication enhancements for transparent and boundary clocks in accordance with aspects of the present disclosure.

Some networks or systems may employ time-sensitive operations. For example, Industrial Internet of Things (IIoT) may implement complex interactions between different machines (e.g., robots, conveyors, etc.) for manufacturing. Time synchronization techniques may be used to synchronize clocks among components of the network and to convey ingress times for received packets. Some networks may use messages, such as Precision Time Protocol (PTP) messages, for informing nodes of the network of information related to timing. However, employing a wireless communication network in these types of systems for distributing communications between network nodes may present challenges in maintaining timing synchronization. The present description provides techniques for a wireless communication system to support time synchronization of components of a time-sensitive network connected via the wireless communication system. Time synchronization can be used to match timing domains and reduce the amount of synchronization error within a network.

A data packet or frame (e.g., an ethernet frame) may be received at a node of a wireless communication system. Reception of the frame may be referred to as an ingress, and the time the frame is received may be referred to as the ingress time. When the wireless communication system then sends a frame related to the received frame, the frame egresses from a node of the wireless communication system. In order to improve timing synchronization, these ingress and egress times can be used to correct timing or identify timing domains.

Different techniques are presented for different configurations and operations of the wireless communication system. For example, a wireless communication system may operate as a transparent clock (e.g., an end-to-end transparent clock, a peer-to-peer transparent clock, etc.) for one or two-step time synchronization messages or as a boundary clock. A wireless communication system that operates as a transparent clock performs a residence time correction for frames in order for networks communicating via the wireless communication system to achieve more accurate synchronization. A wireless communication system that operates as a boundary clock runs one or more master and slave clocks to which clocks at the endpoints of a time sensitive network may synchronize.

If the wireless communication system performs residence time correction for each PTP message that traverses the wireless communication system, it will determine the time spent by each PTP message in the transit. Time spent by a PTP message prior to egressing at an egress point can be computed at the egress point if the ingress time is known at the egress point. For example, time spent prior to the egress point can be the egress time minus the ingress time. The time measured may be with respect to a clock known at both the ingress point and the egress point. The ingress time of a PTP message may be determined based on an ingress time of an ethernet frame containing the PTP message. The egress time of a PTP message may be determined based on the egress time of an ethernet frame containing the PTP message. A determination of the ingress time may use a timestamp of the ingress time (e.g., at the hardware or lower layers of wireless communication device) that was recorded prior to the determination. For example, the determination of the ingress time may take place after the actual ingress of the packet. The determination of the egress time can use a timestamp of egress (e.g., at hardware or lower layers of a wireless communication device) that was recorded prior to the determination (i.e., the determination may take place after ingress).

Some techniques described herein address compensation for a link delay by the wireless communication system. If a wireless communication system acts as a peer-to-peer transparent clock system, performance may be enhanced by correcting for the delay (e.g., a link delay) of the incoming link. Techniques described herein provide field modifications associated with timing in order to compensate for the link delay.

Other techniques address how to reduce processing overhead associated with a search for PTP messages. When a wireless communication system acts as a transparent clock and a UE is an egress point for PTP messages, the UE monitors each PDU carried over each PDU session for the PTP messages, even when some sessions may not carry PTP messages. Techniques described herein provide for an indication that a PDU session may carry PTP messages. In some examples, the indication may be sent using an information element and may only be applicable for ethernet PDU sessions. In some examples, the UE or a user plane function (UPF) may only look for PTP messages in a PDU session that has been indicated to carry PTP messages.

Other techniques address how to reduce processing overhead associated Sync messages. When a wireless communication system acts as a transparent clock, Sync messages may be suppressed from the UE to a UPF or from the UPF to a UE as long the ingress time associated with the Sync message can be signaled to a wireless communication system egress point. A PDU session carrying PTP messages may however carry all PTP messages between a wireless communication system ingress point and a 5GS egress point, consuming resources on the backhaul, fronthaul, and radio. Techniques described herein provide for an indication that UE/UPF acting as a wireless communication system ingress point (which can be UE or UPF) can filter out Sync messages. In some examples, the indication may be sent using an optional information element (IE) and may only be applicable for ethernet PDU sessions. In some examples, based on the signaling, the UE or UPF may act as an ingress point for PTP messages and may filter out Sync messages.

Other techniques described herein address how to determine timing domains for wireless communication systems that act as boundary clocks. When a wireless communication system acts as a boundary clock for a timing domain, a UE associated with the wireless communication system may run a master clock based on timing information provided for the timing domain. The master clock can be run in the UE or in an adaptor/translator connected to the UE. In some examples, an adaptor connected to the UE also may be also used with a translator connected to the UE. Similarly, an adaptor connected to the UPF also may be also used with a translator connected to the UPF. An adaptor or translator connected to the UE or UPF may behave as a time sensitive networking (TSN) translator, such as that discussed in 3GPP TR 23.734 v1.0.0. A UE may support more than one timing domain. For example, this can be achieved by broadcasting timing information associated with the domains via a system information block (SIB). Techniques described herein provide for a UE to identify relevant timing domains by tracking timing domain information in received PTP messages and optionally tracking corresponding virtual local area network (VLAN) tags associated with Ethernet packets containing the PTP messages. Techniques described herein also provide ways for a node (e.g., a UPF or a UPF adaptor or translator), to determine a set of UEs which need to receive a PTP packet in instances of multicast PTP packets. Techniques enable a node to determine which PTP packets to send to which nodes based on timing domain information.

Aspects of the disclosure are initially described in the context of a wireless communication network. Figures are presented which illustrate examples related to a structure of wireless communication system, one-step and two-step transparent clock messages, clocks and timing domains of a 5GS network, and a process flow regarding time synchronization in a wireless communication system. Aspects of the disclosure are further illustrated by and described with reference to apparatus diagrams, system diagrams, and flowcharts that relate to wireless communication system enhancements for transparent and boundary clocks.

FIG. 1 illustrates an example of a wireless communication network 100 that supports wireless communication system enhancements for transparent and boundary clocks in accordance with aspects of the present disclosure. The wireless communication network 100 includes base stations 105, UEs 115, and a core network 130. In some examples, the wireless communication network 100 may be a Long Term Evolution (LTE) network, an LTE-Advanced (LTE-A) network, an LTE-A Pro network, or a New Radio (NR) network. In some cases, wireless communication network 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication network 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication network 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap. Overlapping geographic coverage areas 110 associated with different technologies may be supported by the same base station 105 or by different base stations 105. The wireless communication network 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication network 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication network 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication network 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication network 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication network 100 may also operate in an extremely high frequency (EHF) region of the spectrum (e.g., from 30 GHz to 300 GHz), also known as the millimeter band. In some examples, wireless communication network 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication network 100 may utilize both licensed and unlicensed radio frequency spectrum bands. For example, wireless communication network 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication network 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication network 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication network 100 and may be referred to as a transmission time interval (TTI). In other cases, a smallest scheduling unit of the wireless communication network 100 may be shorter than a subframe or may be dynamically selected (e.g., in bursts of shortened TTIs (sTTIs) or in selected component carriers using sTTIs).

In some wireless communication networks, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication networks may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication network 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication network 100 (e.g., base stations 105 or UEs 115) may have a hardware configuration that supports communications over a particular carrier bandwidth or may be configurable to support communications over one of a set of carrier bandwidths. In some examples, the wireless communication network 100 may include base stations 105 and/or UEs 115 that support simultaneous communications via carriers associated with more than one different carrier bandwidth.

Wireless communication network 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication network 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication network 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more UEs 115 may include a communications manager, which may perform time synchronization for a wireless communication system as described herein. For example, a UE 115 may receive a first ethernet frame including a PTP message, determine an ingress time for the PTP message received at UE 115, generate a PDU for transmission to a second node of the wireless communication network based on the first ethernet frame by overwriting a field in the PTP message with a value corresponding to the ingress time for the PTP message, and send the PDU to the second node.

Figure 2:
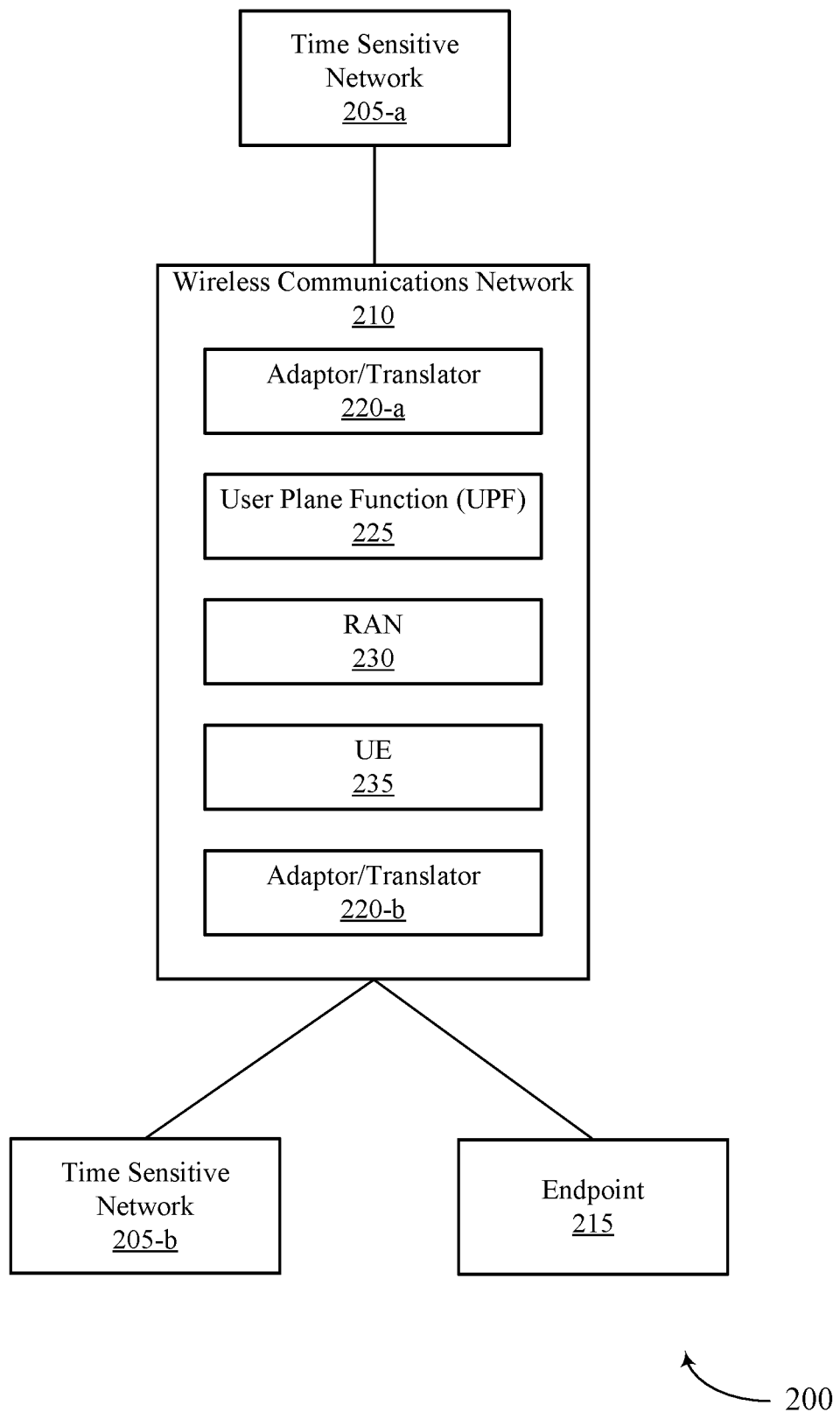
FIG. 2 illustrates an example of a communication system that supports wireless communication enhancements for transparent and boundary clocks in accordance with aspects of the present disclosure.

FIG. 2 illustrates an example of a communication system 200 that supports wireless communication system enhancements for transparent and boundary clocks in accordance with aspects of the present disclosure. In some examples, communication system 200 may implement aspects of wireless communication network 100. Communication system 200 may include two time sensitive networks 205-*a* and 205-*b* (collectively referred to as TSNs 205), a wireless communication network 210, and an endpoint 215. Communication system 200 may include different numbers of TSNs 205 and endpoints 215. Traffic and timing information may be exchanged between the different components of communication system 200.

In some examples, one or more of the TSNs 205 may be networks including components that have relatively high requirements for synchronization. For example, TSNs 205 may be IIoT networks which may coordinate many components at once. For example, an IIoT network may coordinate the actions of multiple fast moving robotic arms operating on an assembly line. The IIoTs may have a synchronization error requirement of, for example, less than or equal to 1 microsecond (µs). TSNs 205 may use time synchronization techniques to meet these synchronization error requirements. Time synchronization can be used to match timing domains and reduce the amount of synchronization error within a network. In some examples, one or more of TSNs 205 may be wired or wireless networks.

Wireless communication network 210 may support time synchronization techniques. For example, wireless communication network 210 may support features of the TSNs 205, such as time synchronization. A synchronization protocol may be used for time synchronization, for example, PTP versions 1 or 2, gPTP, or those defined in IEEE 1588-2008, 1588-2002, or 802.1AS. In other examples, other synchronization protocols may be used. Generally, messages associated with these protocols are referred to herein as PTP messages. In different examples, a different system, technique, or protocol may be used for time synchronization in wireless communication network 210.

Wireless communication network 210 may include a number of components, some of all of which may be considered nodes in wireless communication network 210. In the example shown in FIG. 2, wireless communication network 210 may include two or more adaptors or translators 220-*a* and 220-*b* (collectively referred to herein as adaptor/translators 220), one or more user plane functions 225, one or more radio access networks (RANs) 230, and one or more UEs 235. In some examples, wireless communication network 210 includes an adaptor/translator 220 and a UE or UPF for each endpoint 215 in communication system 200.

In some examples, wireless communication network 210 may be a 5G NR system. A data packet or frame (e.g., an ethernet frame) may arrive (e.g., ingress) at wireless communication network 210. The data packet or frame ingresses at a node of wireless communication network 210 at a particular time. That time may be referred to as an ingress time. When wireless communication network 210 sends a data packet or frame related to the received information outside of wireless communication network 210, the data packet or frame egresses from a node of wireless communication network 210. In order to improve time synchronization, these ingress and egress times can be used to support time synchronization of components of a TSN that communicate via the wireless communication network 210.

Techniques described herein provide ways to convey an ingress time for a PTP message received at an ingress point of wireless communication network 210 to an egress point in order to improve support of time synchronization for components communicating via wireless communication network 210. An ingress point of wireless communication network 210 may be an adaptor/translator 220 connected to a UE 235 or a UPF 225 or may be part of a UE 235 or a UPF 225. Likewise, an egress point of wireless communication network 210 may be another adaptor/translator 220 connected to a different UE 235 or a UPF 225 or may be part of a different UE 235 or a UPF 225. Any component of wireless communication network 210 that may serve as an ingress point or an egress point may be referred to herein as a node.

Figure 3A:
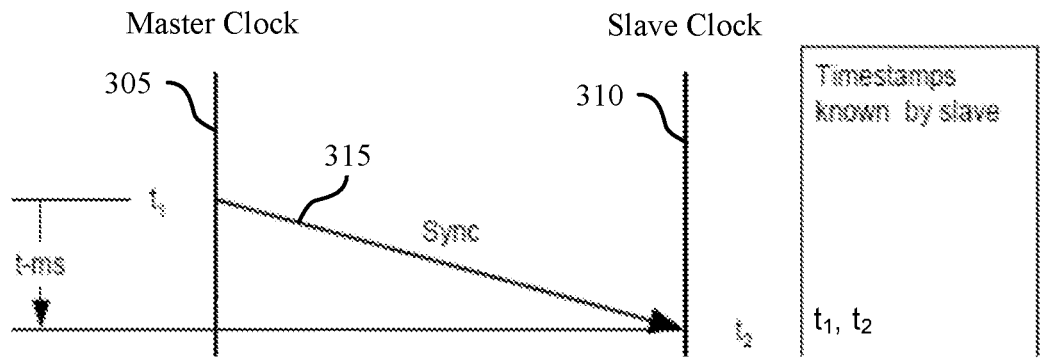
FIGS. 3A and 3B illustrate examples of a timing diagram for transparent clocks and boundary clocks in accordance with aspects of the present disclosure.
Figure 3B:
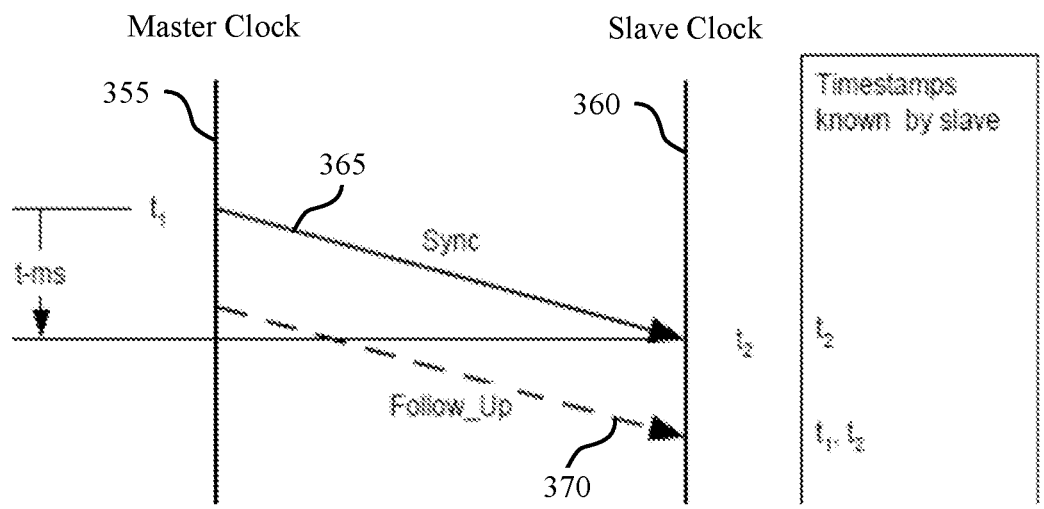

FIGS. 3A and 3B illustrate different types of time synchronization operations that can affect timing in a wireless communication network. FIG. 3A illustrates an example of a timing diagram 300 that supports a one-step synchronization message in accordance with aspects of the present disclosure. In some examples, wireless communication networks 100 or 200 may implement aspects of the timing diagram 300. Timing diagram 300 illustrates differences in timing regarding a sync message 315 according to two different clocks.

Timing diagram 300 illustrates how a time indicated at a master clock 305, which may be a master clock in a TSN such as a TSN 205, may be conveyed to a slave clock 310. In some examples, master clock 305 corresponds to a first node of a TSN and slave clock 310 corresponds to a different node of the TSN. According to a method of synchronization using the one-step synchronization message, a Sync message 315 (e.g., a data packet or a frame) departs the first node at time $t_1$ (i.e., the egress time) according to master clock 305. In the one-step operation, hardware (e.g., a physical layer) will timestamp Sync message 315 to identify $t_1$.

Slave clock 310, operating at a second node of the wireless communication network, determines an ingress time $t_2$ corresponding to when the second node received Sync message 315. Thus, when slave clock 310 receives Sync message 315, the second node knows the current time and the time that Sync message 315 was sent according to master clock 305. Thus, slave clock 310 can update its clock, if necessary, to synchronize with master clock 305 based on the one-step Sync message 315. Some of the techniques described herein apply to networks that use the one-step operation.

However, it may be difficult to include the egress timestamp in the same Sync message 315 that is being sent because the first node cannot always precisely determine when it will send Sync message 315. For example, Sync message 315 may be generated by a layer different (e.g., above) a physical layer of a device, and may not precisely control the egress time.

FIG. 3B illustrates an example of a timing diagram 350 that supports a two-step synchronization message in accordance with aspects of the present disclosure. In some examples, wireless communication network may implement aspects of the timing diagram 350. Timing diagram 300 illustrates differences in timing regarding a Sync message 315 according to two different clocks.

Timing diagram 350 illustrates how a time indicated at a master clock 355 may correspond to a time according to a slave clock 360. The master clock 355 may be a master clock in a TSN and the slave clock 360 may be a slave clock in the TSN.

According to the method of synchronizing using the two-step synchronization message, a Sync message 365 (e.g., a data packet or a frame) departs the first node at time $t_1$ (i.e., the egress time) according to master clock 355. In contrast with the one-step operation, the Sync message 365 does not carry a time stamp of the egress time. Instead, the two-step operation sends a Follow_Up message 370 after Sync message 365 is sent. Follow_Up message 370 identifies $t_1$, the time that Sync message 365 was sent. In some cases, a more accurate timestamp for $t_1$ can be sent to the second node than in the one-step method.

Slave clock 310, operating at a second node of the TSN, determines an ingress time $t_2$ corresponding to when the second node received Sync message 365. The second node determines $t_1$ from the timestamp in Follow-Up message 370. Thus, slave clock 360 can update its clock, if necessary, to synchronize with master clock 355 based on the two-step Sync message 365 and Follow_Up message 370. Some of the techniques described herein apply to networks that use the two-step operation.

Figure 4:
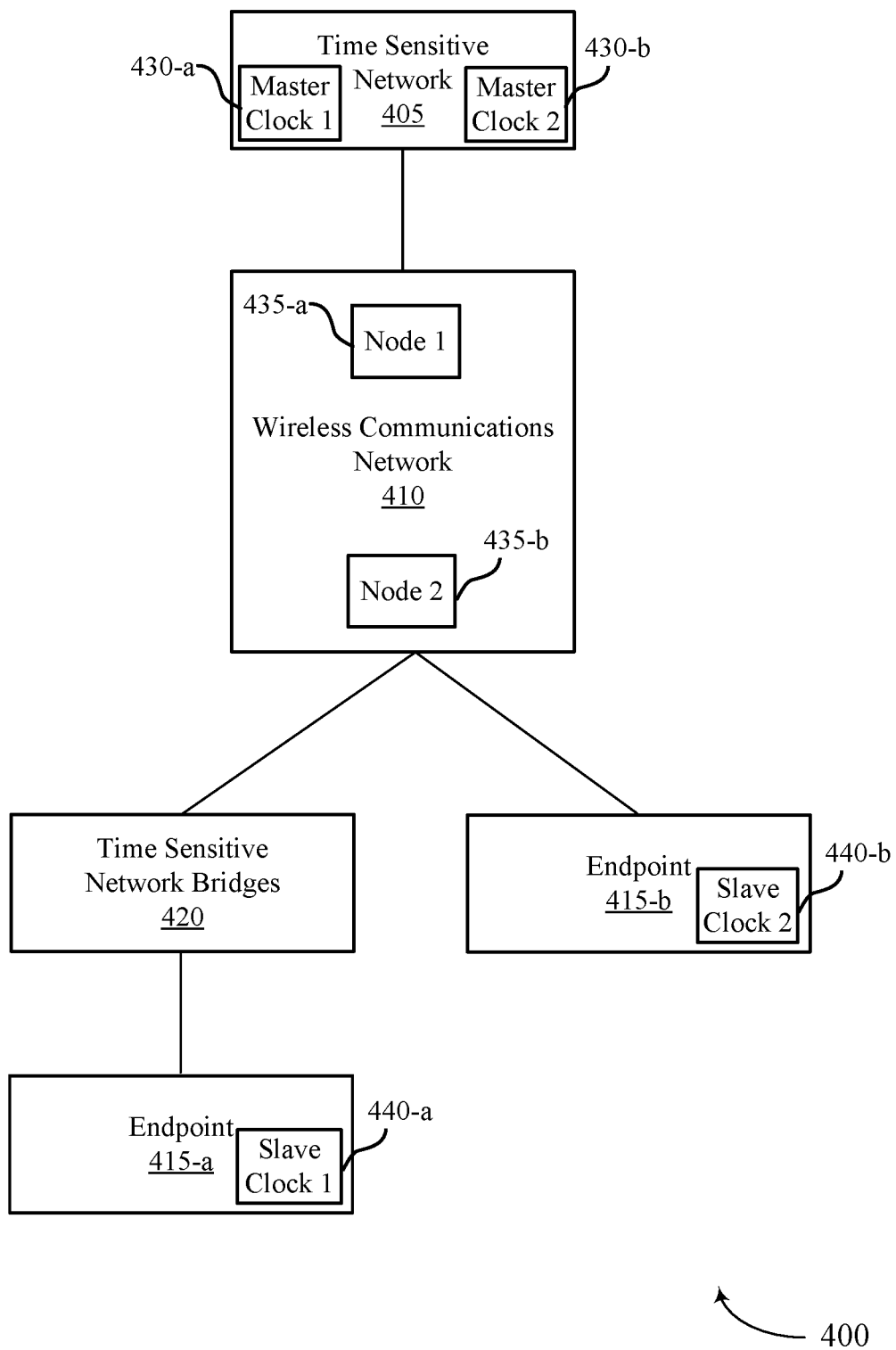
FIG. 4 illustrates an example of a communication system that supports wireless communication enhancements for transparent clocks in accordance with aspects of the present disclosure.

FIG. 4 illustrates an example of a communication system 400 that supports wireless communication system enhancements for transparent clocks in accordance with aspects of the present disclosure. In some examples, communication system 400 may implement aspects of wireless communication network 100 and 200. FIG. 4 illustrates an example where a wireless communication network 410 of communication system 400 may act as a transparent clock.

Communication system 400 may be an example of wireless communication network 100 or 200 of FIGS. 1 and 2, respectively. Communication system 400 may include a TSN 405, wireless communication network 410, one or more TSN bridges 420, and endpoints 415-a and 415-b (collectively referred to herein as endpoints 415). In other examples, other numbers of TSNs 405, wireless communication networks 410, TSN bridges 420, and endpoints 415 may be part of communication system 400, which may be examples of aspects of the respective components as described above with reference to FIGS. 1 and 2. In some cases, TSN bridges 420 and endpoints 415 may be considered to be part of TSN 405.

Different approaches for synchronization of components of TSN 405 such as endpoints 415 via wireless communication network 410 may be used. In the example of FIG. 4, wireless communication network 410 acts as a transparent clock. TSN 405 is shown including two different timing domains corresponding to master clock 1 430-a and master clock 2 430-b. A slave clock 1 440-a and a slave clock 2 440-b in endpoints 415 are slaves of the master clock 1 430-a and master clock 2 430-b, respectively. Wireless communication system 410 includes at least one node that performs residence time correction for PTP messages that travel through wireless communication system 410. In the example of FIG. 4, wireless communication system 410 includes two nodes 435-a and 435-b, which each may correspond to a UE, a UPF, or an adaptor/translator connected with or incorporated in a UE or UPF.

The wireless communication system 410 may carry synchronization messages (e.g., PTP messages) with corrections to fields in messages based on a residence time of the message within wireless communication system 410. Residence time correction (RTC) may be used to correct for the time it takes a synchronization message (e.g., Sync, Follow_Up) to propagate through wireless communication system 410. For example, if a PTP message is received from TSN 405 at node 1 435-a of wireless communication system 410 at time $t_1$, sent to node 2 435-b, and transmitted from node 2 435-b to another node of TSN 405 (e.g., an end point 415) at time $t_2$, one or more timing values within the PTP message may be adjusted based on $t_2$-$t_1$, such that the propagation delay within wireless communication system 410 is transparent to the TSN (e.g., the message appears to have been sent from the TSN 405 at $t_2$ with no propagation delay through wireless communication system 410). Wireless communication system 410 may act as a transparent clock for one-step synchronization messages or two-step synchronization messages.

Figure 5:
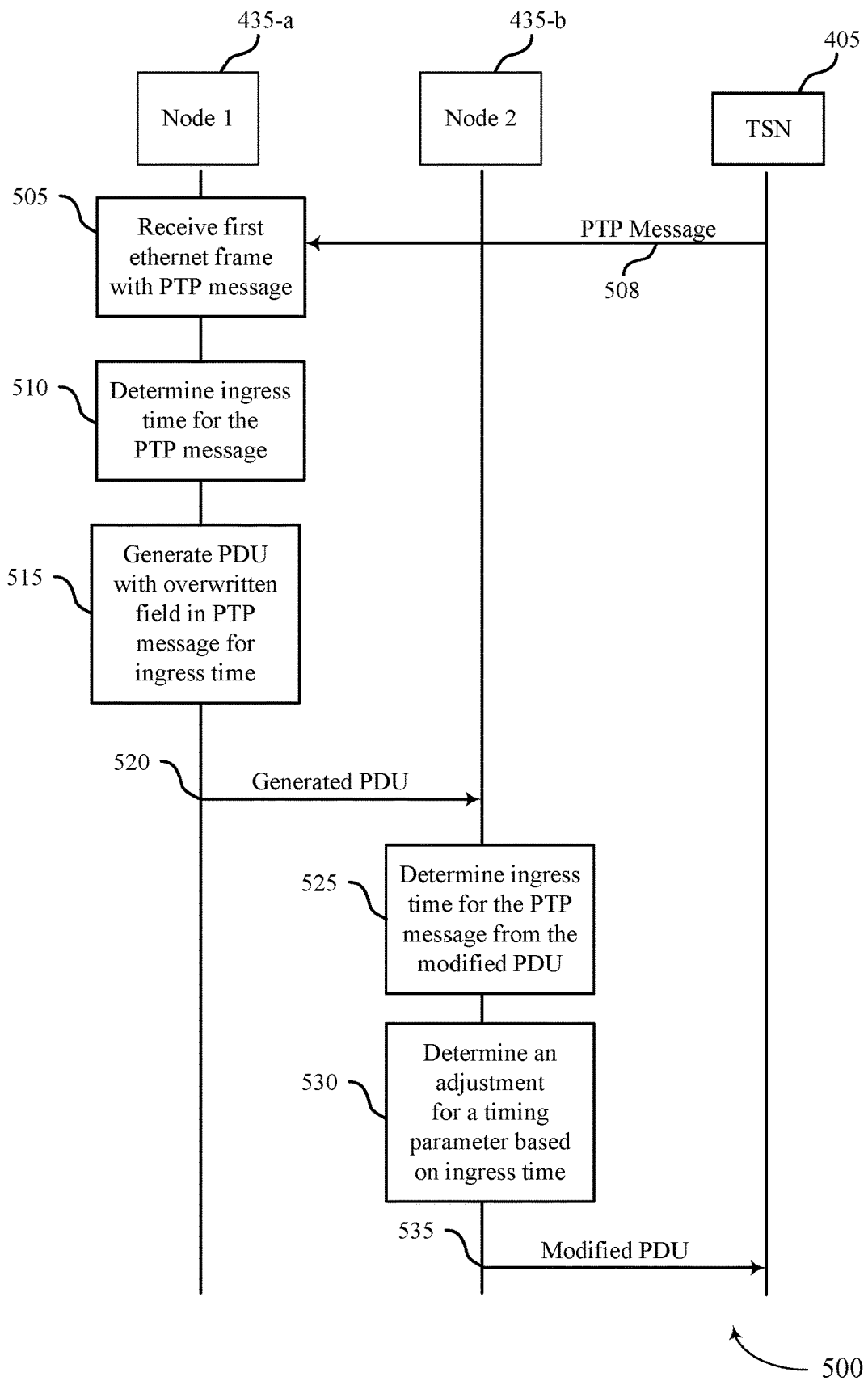
FIG. 5 illustrates an example of a process flow that supports wireless communication enhancements for boundary clocks in accordance with aspects of the present disclosure.

FIG. 5 illustrates an example of a process flow 500 that supports wireless communication system enhancements for transparent and boundary clocks in accordance with aspects of the present disclosure. In some examples, process flow 500 may be implemented by aspects of wireless communication networks 100, 200, or 400. For example, process flow 500 may illustrate message flow and timing techniques in an example operation of communication system 400, including communication between TSN 405, node 1 435-a, and node 2 435-b. For the purposes of the example of FIG. 5, node 1 435-a is an ingress point of wireless communication system 410 and node 2 435-b is an egress point of wireless communication system 410.

At 505, node 1 435-a receives a first ethernet frame that includes a PTP message 508. Node 1 may receive the first ethernet frame from another component of the communications system, such as TSN 405 or an endpoint 415 of TSN 405. The PTP message 508 may be a Sync message or a Follow_Up message. In some examples, the first ethernet frame is any type of frame or data packet carrying a PTP message. In some examples, the ethernet frame including the PTP message 508 may be detected using ethertype in the ethernet header.

At 510, node 1 435-a determines an ingress time for PTP message 508. That is, node 1 435-a may record the time that it received PTP message 508. This recorded time may be referred to as an ingress timestamp. The timestamp may be based on a clock known to the ingress point, node 1 435-a, that may also be known at a potential egress point of wireless communication system 410, such as node 2 435-b. For example, node 1 435-a and node 2 435-b may have synchronized system clocks. In one example, node 1 435-a may be a UPF and node 2 435-b may be a UE 115, and the UPF and UE 115 may synchronize their system clocks to wireless communication system 410 (e.g., via wired or wireless synchronization signals).

At 515, node 1 435-*a* may generate a PDU for transmission to a second node of the wireless communication network, such as node 2 435-*b*. The PDU may be based at least in part on the first ethernet frame, and may carry the PTP message 508. The PDU may additionally carry the ingress timestamp. That is, UE 115-*a* may generate a new ethernet PDU by modifying the ethernet frame to include the ingress timestamp.

The ethernet frame may be modified in one of several ways. For example, the ingress timestamp may be appended to the ethernet frame of the ethernet PDU. The ingress timestamp may be appended at the beginning of the frame, the end of the frame, or to a payload portion of the frame, for example. In other examples, the ingress timestamp may be appended to the ethernet frame in other ways. Another way of modifying the ethernet frame to include the ingress timestamp may be to set a field in the PTP message to indicate a value associated with the ingress timestamp. For example, an originTimestamp field of a Sync PTP message (e.g., as part of a two-step synchronization message) may be overwritten with the ingress timestamp. In another example, a field in a header of the Sync PTP message may be overwritten with the ingress timestamp. The field in the header may be a correctionField. In another example, a typed link value (TLV) of a PTP message may be overwritten with the ingress timestamp. In some examples, the TLV may be organization specific. Setting a field in the PTP message with the ingress timestamp or a value related to the ingress timestamp may override the typical information that the field carries.

Node 1 435-*a* sends the generated PDU 520 with the PTP message modified to include information related to the ingress timestamp to node 2 435-*b*. Node 1 435-*a* may send generated PDU 520 to more than one egress point of the wireless communication network. In some examples, the generated PDU may be sent to more than one UE 115 or more than one UPF, for example, for multicast PTP messages.

Once node 2 435-*b* receives generated PDU 520, at 525 it may determine the ingress time for the PTP message from generated PDU 520. Node 2 435-*b* may determine the ingress time for the PTP message for the wireless communication network from a field in the PTP message overwritten with a value corresponding to the ingress time for the PTP message. At 530, UE 115-*b* may determine an adjustment for a timing parameter associated with the PTP message based at least in part on the ingress time. Node 2 435-*b* may use the ingress timestamp or the value related to the ingress timestamp for a residence time correction computation.

In some examples, node 2 435-*b* may send a modified PDU 535 or ethernet frame associated with the ethernet PDU outside of the wireless communication network (e.g., the 5G NR network). Node 2 435-*b* may have modified the modified PDU 535 by removing any appended ingress timestamps from the ethernet frame or altering a field in the PTP message that contained the information related to the ingress timestamp. The field may be altered by setting the field to a configured value (e.g., zero) if the field in the PTP message was used to send the information related to the ingress timestamp. Modified PDU 535 may also have an adjusted correction field in the PTP message based on the residence time computation.

The example of FIG. 5 may be performed for any one-step or two-step transparent clock. However, when the wireless communication network 410 acts as a two-step transparent clock, a field may be set in the PTP message based on an ingress time for a different PTP message. For example, a field may be set in a PTP message based on a value in a field of a different PTP message that is received after the first PTP message. In one example, an originTimeStamp field may be set in a Sync message based on a preciseOriginTimeStamp field in a Follow_Up message associated with the Sync message. The Sync message may be modified with this information after its initial reception at node 1 435-*a* or node 2 435-*b*. In some cases, the Follow_Up message may be suppressed at node 1 435-*a* or node 2 435-*b* (e.g., two-step synchronization messages may be converted to one-step synchronization messages for transmission outside of wireless communication network 410.

In some cases, an ingress node of wireless communication network 410 may suppress sending one or more PTP messages to an egress node for overhead reduction. For example, if two-step synchronization messages are sent from TSN 405, the Sync message may be suppressed at the ingress node (e.g., node 1 435-*a*), and the egress node (e.g., node 2 435-*b*) may regenerate the Sync message with appropriate timing based on the ingress time. In some examples, the ingress or egress node may send an indication that a PDU session established between the nodes may carry PTP messages. In some examples, the indication may be sent using an information element and may only be applicable for ethernet PDU sessions. In some examples, a node (e.g., UE or UPF) may only look for PTP messages in a PDU session that has been indicated to carry PTP messages. In some examples, an ingress or egress node may signal support for filtering of Sync messages. For example, an egress node may signal to an ingress node that it supports re-generating Sync messages, and the ingress node may filter Sync messages based on the indication. Alternatively, an ingress node may signal support for filtering Sync messages, and the egress point may re-generate Sync messages based on the indication and information in other PTP messages (e.g., Follow_Up messages).

Additional techniques address link delay from the TSN to the ingress node. For example, the ingress node (e.g. node 1 435-*a*) may compensate for link delay at 510 and 515. For example, wireless communication network 410 may operate as a peer-to-peer transparent clock and may compensate for the link delay between TSN 405 and node 1 435-*a*. Node 1 435-*a* may compensate for the link delay by adjusting (e.g. adding, subtracting) the link delay from a field (e.g., originTimestamp, correctionField) in a PTP message prior to sending the PTP message in PDU 520 to the egress node (e.g., node 2 435-*b*). Alternatively, node 1 435-*a* may adjust for the link delay by adjusting the ingress time signaled to the egress node (e.g., in the overwritten field of the PTP message or in the appended ingress time). Thus, when the egress node corrects for the ingress time, the link delay is also corrected for.

In some examples, node 1 435-*a* may establish a PDU session with a second node of the wireless communication network, the PDU session associated with PTP messages. Node 1 435-*a* may receive, from node 2 435-*b*, from the second node of the wireless communication network, an indicator of a capability of the second node for filtering Sync messages of the PTP messages. In some examples, the indicator is included in an information element of a PDU, which may be a new field associated with the PDU. Node 1 435-*a* may process one or more PTP messages from the second node based at least in part on the indicator.

In another example, node 1 435-*a* may receive a PTP message associated with a destination, where node 2 435-*b* serves as a packet gateway for the destination for the wireless communication network. For example, node 2 435-*b* may be a UPF. Node 1 435-*a* may send the PTP message to node 2 435-*b*. Node 1 435-*a* may send a representation of the PTP message to a third node of the wireless communications network. Node 1 435-*a* may send the representation of the PTP message via a user plane message or a control plane message. For example, node 1 435-*a* may forward the PTP message to the third node. In some examples, the third node may be one of an AMF, a UPF, or a base station, such as the TSN 405. In some examples, the third node may be node 2 435-*b*.

Figure 6:
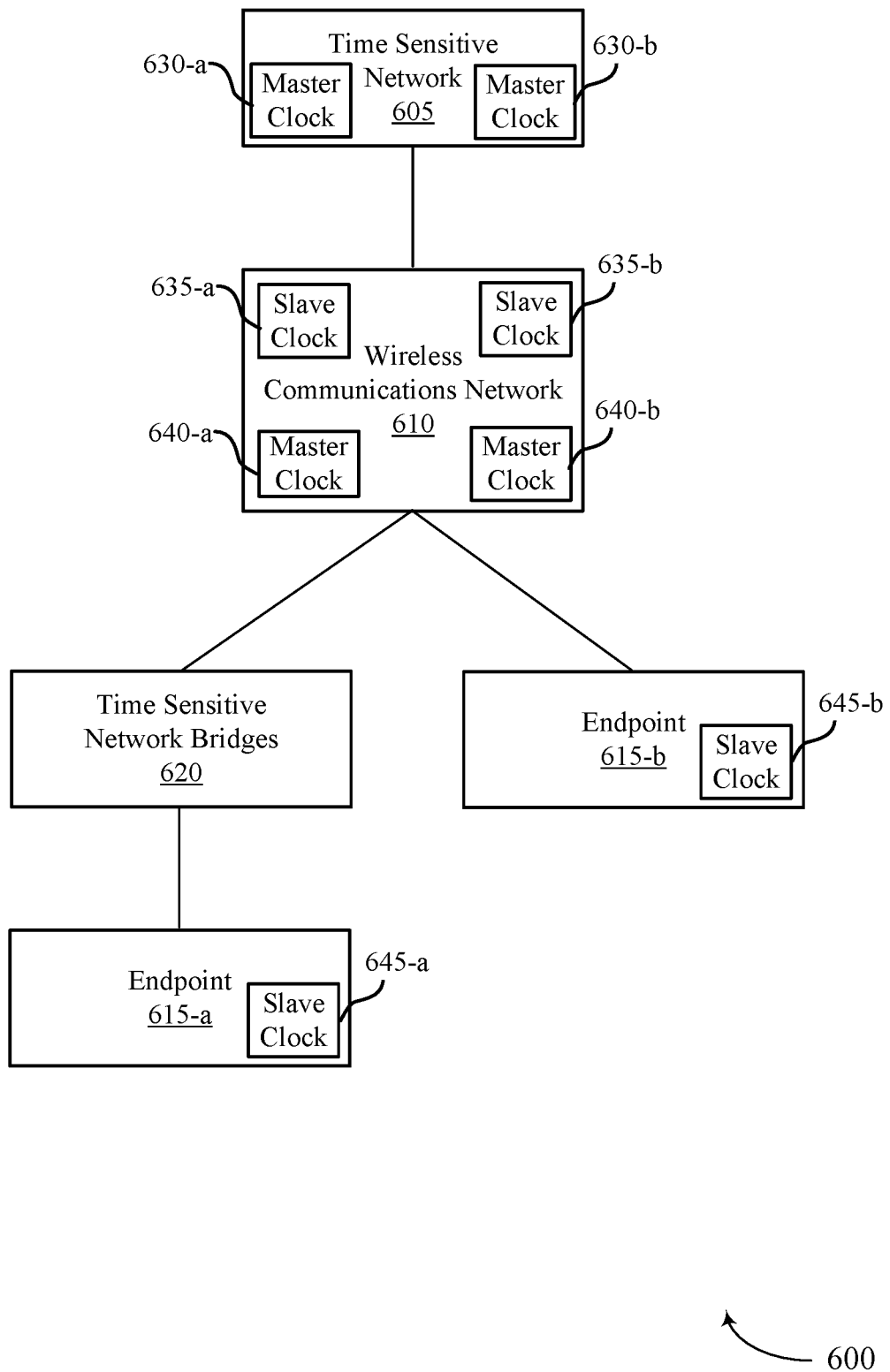
FIG. 6 illustrates an example of a communication system that supports wireless communication enhancements for transparent and boundary clocks in accordance with aspects of the present disclosure.

FIG. 6 illustrates an example of a communication system 600 that supports wireless communication system enhancements for transparent and boundary clocks in accordance with aspects of the present disclosure. In some examples, communication system 600 may implement aspects of communication systems 100, 200, or 400. FIG. 6 illustrates an example where a wireless communication system 610 of communication system 600 may act as a boundary clock.

Communication system 600 may be an example of wireless communication system 100, 200, or 400 of FIGS. 1, 2, and 4, respectively. Communication system 600 may include a TSN 605, a wireless communication network 610, one or more TSN bridges 620, and endpoints 615-*a* and 615-*b* (collectively referred to herein as endpoints 615). In other examples, other numbers of TSNs 605, wireless communication system 610, TSN bridges 620, and endpoints 615 may be part of communication system 600, which may be examples of aspects of the respective components as described above with reference to FIGS. 1, 2, and 4.

In another approach for synchronization via wireless communication system 610, wireless communication system 610 acts as a boundary clock. For example, clocks 630 for one or more timing domains within TSN 605 may act as master clocks, such as a master clock 1 630-*a* and a master clock 2 630-*b*. Some clocks within wireless communication network 610 may act as slave clocks 635-*a* and 635-*b*, while other clocks 640-*a* and 640-*b* act as master clocks. In some examples, the same clocks act both as slave and master clocks. The slave clocks 635 within wireless communication network 610 may slave to master clocks 630 in TSN 605 (e.g., via received synchronization messages). The master clocks 640 within wireless communication network 610 may be based on the slave clocks 635 within wireless communication network 610. For example, a master clock 640 within a UE may synchronize its system clock with wireless communication network 610 using transmitted synchronization signals (e.g., synchronization blocks), and may a maintain master clock 640 to be a synchronized version of a slave clock 635 via internal signaling of a correspondence of the slave clock 635 with the system clock. Clocks within endpoints 615-*a* and 615-*b* may act as slave clocks 645-*a* and 645-*b*, respectively, that slave to master clocks 640 in wireless communication system 610. In another part of the communication system 600. For example, a nodes of wireless communication system 610 maintaining master clock 640-*a* may transmit synchronization messages (e.g., PTP messages) to slave clock 645-*a* according to the timing of master clock 640-*a*. That is, master clock 640-*a* may be synchronized to master clock 630-*a*, but may transmit PTP messages independently of PTP messages sent by master clock 630-*a*.

In some examples, the UE or UPF may identify relevant timing domains by tracking timing domain information in received PTP messages and optionally tracking corresponding VLAN tags associated with ethernet packets containing the PTP messages. The UE or UPF may save the domain information in a received PTP message contained in domain-Number field in header of the PTP message. Specific examples for timing domain information in PTP messages may include that the UE may save domain information in a Pdelay_req message contained in domainNumber field in header of the Pdelay_req message or that UE may save domain information in an Announce message contained in domainNumber field in header of the Announce message. A list of relevant timing domains may include the saved timing domains. The UE or UPF may then maintain a master clock for the list of relevant timing domains saved from PTP messages. A timing domain may be removed from a list of relevant timing domains if the associated timing domain is not part of any PTP messages for a duration satisfying a threshold (e.g., TimingDomain_TimeoutDuration).

Figure 7:
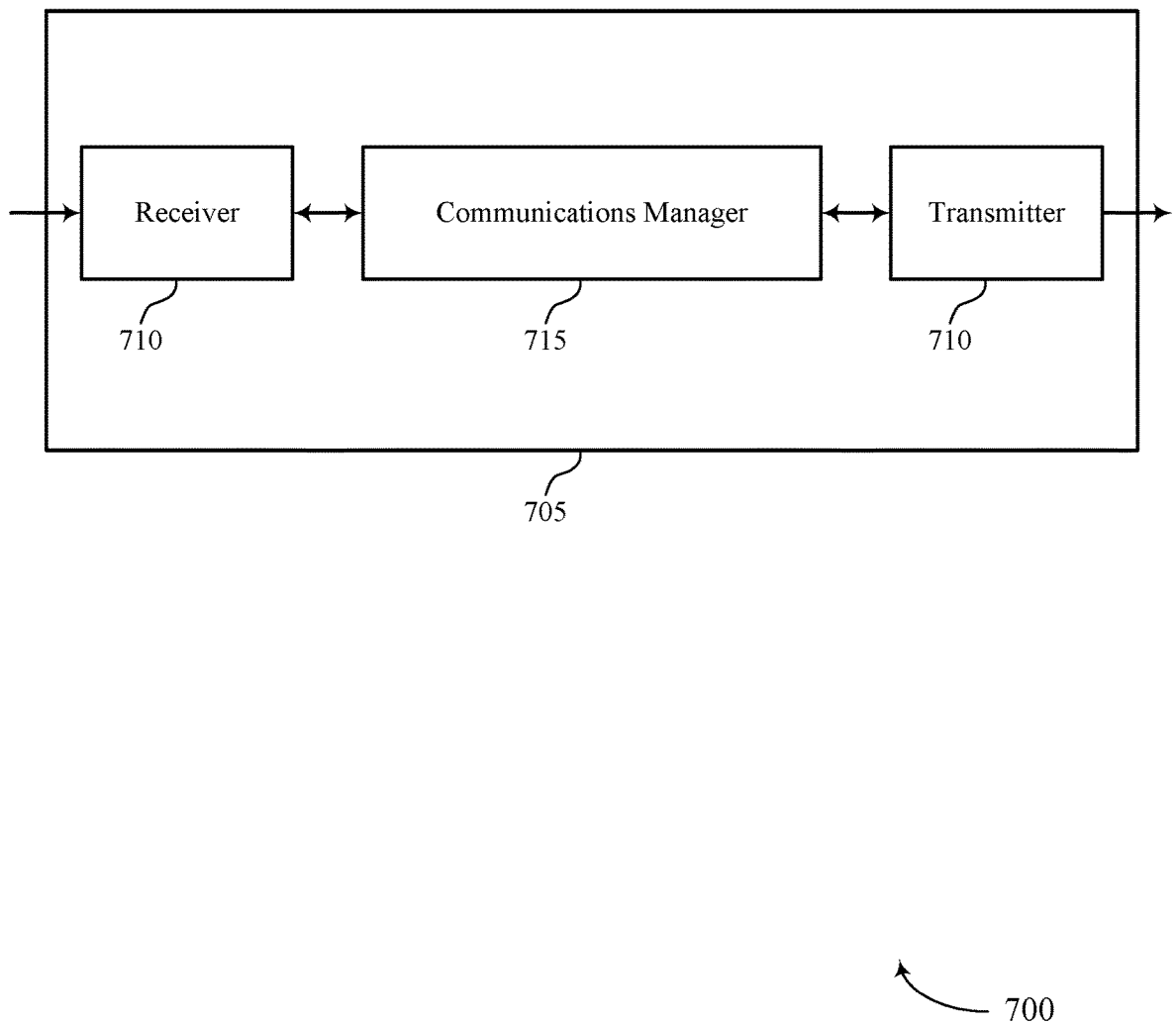
FIGS. 7 and 8 show block diagrams of devices that support wireless communication enhancements for transparent and boundary clocks in accordance with aspects of the present disclosure.

FIG. 7 shows a block diagram 700 of a wireless device 705 that supports timing synchronization in accordance with various aspects of the present disclosure. Wireless device 705 may be an example of aspects of a UE 115, an adaptor/translator 220, or a UPF 225 as described with reference to FIGS. 1, 2, and 4-6. Wireless device 705 may include receiver 710, communication manager 715, and transmitter 720. Wireless device 705 may also include a processor. Each of these components may be in communication with one another (e.g., via one or more buses).

Receiver 710 may receive information such as packets, ethernet frames, user data, or control information associated with various information channels (e.g., control channels, data channels, and information related to wireless transmission timing based on timing advance values in shortened transmission time interval transmissions, etc.). Information may be passed on to other components of device 700. Receiver 710 may be an example of aspects of a transceiver 1135 described with reference to FIG. 10.

In some examples, receiver 710 may receiving a first ethernet frame comprising a PTP message. In some examples, the PTP message is a first PTP message. In other examples, receiver 701 may receive, from a second node of the wireless communication network, a session connectivity message associated with a PDU session, the session connectivity message comprising an indicator that the PDU session supports PTP messages. For example, receiver 710 may establish a PDU session with a first UE for communication of PTP messages associated with one or more timing domains. In some examples, receiver 710 may also receive a second ethernet frame comprising a second PTP message associated with the first PTP message.

In some examples, receiver 710 may receive, from a second node of the wireless communication network, a PDU associated with first and second ethernet frames received at the second node, the first ethernet frame comprising a first PTP message, and the second ethernet frame comprising a second PTP message. In another example, receiver 710 may receive, from one or more UEs served by the first node, an indicator of one or more timing domains to be supported by the one or more UEs. For example, receiver 710 may receive one or more indicators of a plurality of timing domains supported by the first UE. PTP messages for the plurality of timing domains may be communicated with the first UE via the PDU session. In another example, receiver 710 may receive, from a second node of the wireless communication network, an indicator of one or more supported timing domains.

Communication manager 715 may be an example of aspects of the wireless communications network 510 described with reference to FIGS. 5 and 6. Communication manager 715 and/or at least some of its various sub-components may be implemented in hardware, software executed by a processor, firmware, or any combination thereof. If implemented in software executed by a processor, the functions of the communication manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communication manager 715 and/or at least some of its various sub-components may be physically located at various positions, including being distributed such that portions of functions are implemented at different physical locations by one or more physical devices. In some examples, communication manager 715 and/or at least some of its various sub-components may be a separate and distinct component in accordance with various aspects of the present disclosure. In other examples, communication manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communication manager 715 may determine an ingress time for the PTP message received at the first node. Communication manager 715 may also generate a PDU for transmission to a second node of the wireless communication network based at least in part on the first ethernet frame by overwriting a field in the PTP message with a value corresponding to the ingress time for the PTP message.

In examples where communication manager 715 is acting as an egress node, communication manager 715 may determine an ingress time for the PTP message for the wireless communication network from a field in the PTP message overwritten with a value corresponding to the ingress time for the PTP message. Communication manager 715 may also determine an adjustment for a timing parameter associated with the PTP message based at least in part on the ingress time.

In another example, communication manager 715 may monitor one or more PDUs received from the second node for PTP messages based at least in part on the indicator that the PDU session supports PTP messages. Communication manager 715 may also identify a PTP message in a PDU of the one or more PDUs based at least in part on the monitoring. Communication manager 715 may also identify a PTP message in a PDU of the one or more PDUs. Communication manager 715 may also receive, from one or more UEs served by the first node, an indicator of one or more timing domains to be supported by the one or more UEs.

In some examples, communication manager 715 may determine an ingress time for the first PTP message received at the first node and generate a PDU for transmission to a second node of the wireless communication network based at least in part on the second ethernet frame, the PDU comprising a value corresponding to the ingress time for the first PTP message.

In another example, communication manager 715 may determine an ingress time for the first PTP message received at the second node based at least in part on the PDU (e.g., based on one or more octets of the PDU associated with the ingress time). Communication manager 715 may determine an adjustment for a timing parameter of the second PTP message based at least in part on the ingress time.

Communication manager 715 may determine a link delay time for the PTP message between transmission from the time sensitive network and reception by the first node in some examples. Communication manager 715 may also generate a PDU for transmission to a second node of the wireless communication network based at least in part on adjusting a field of the PTP message according to a link delay.

In another example, communication manager 715 may include identify one or more relevant timing domains for the wireless communication network based at least in part on the PTP message. Communication manager 715 may maintain a boundary clock for each of the one or more timing domains.

In yet another example, communication manager 715 may establish a PDU session with a second node of the wireless communication network, the PDU session associated with PTP messages. Communication manager 715, may receive, via receiver 710 and from the second node of the wireless communication network, an indicator of a capability of the second node for filtering Sync messages of the PTP messages. In some examples, the indicator is included in an information element of a PDU, which may be a new field associated with the PDU. Communication manager 715 may process one or more PTP messages from the second node based at least in part on the indicator.

In another example, communication manager 715 may receive, via receiver 710, a PTP message associated with a destination, where a second node serves as a packet gateway for the destination for the wireless communication network. Communication manager 715 may send, via transmitter 710, the PTP message to the second node. Communication manager 715 may cause transmitter 710 to send a representation of the PTP message to a third node of the wireless communications network. Transmitter 710 may send the representation of the PTP message via a user plane message or a control plane message. For example, communication manager 715 may, via transmitter 710, forward the PTP message to the third node. In some examples, the third node may be one of an AMF, a UPF, or a base station. In some examples, the third node may be the same as the second node.

Transmitter 720 may transmit signals generated by other components of the device. In some examples, transmitter 720 may be collocated with receiver 710 in a transceiver module. For example, transmitter 720 may be an example of aspects of the transceiver 1135 described with reference to FIG. 10. The transmitter 720 may include a single antenna, or it may include a set of antennas. For example, transmitter 720 may send the PDU to a second node.

In some examples, transmitter 720 may send, to a second node of the wireless communication network, a session connectivity message associated with a PDU session for conveying the frame, the session connectivity message comprising an indicator that the PDU session supports PTP messages. Transmitter 720 may send, to the second node, a PDU comprising the PTP message. In another example, transmitter 720 may send, for each timing domain of the one or more timing domains, an identifier of the timing domain and timing information associated with the timing domain.

Figure 8:
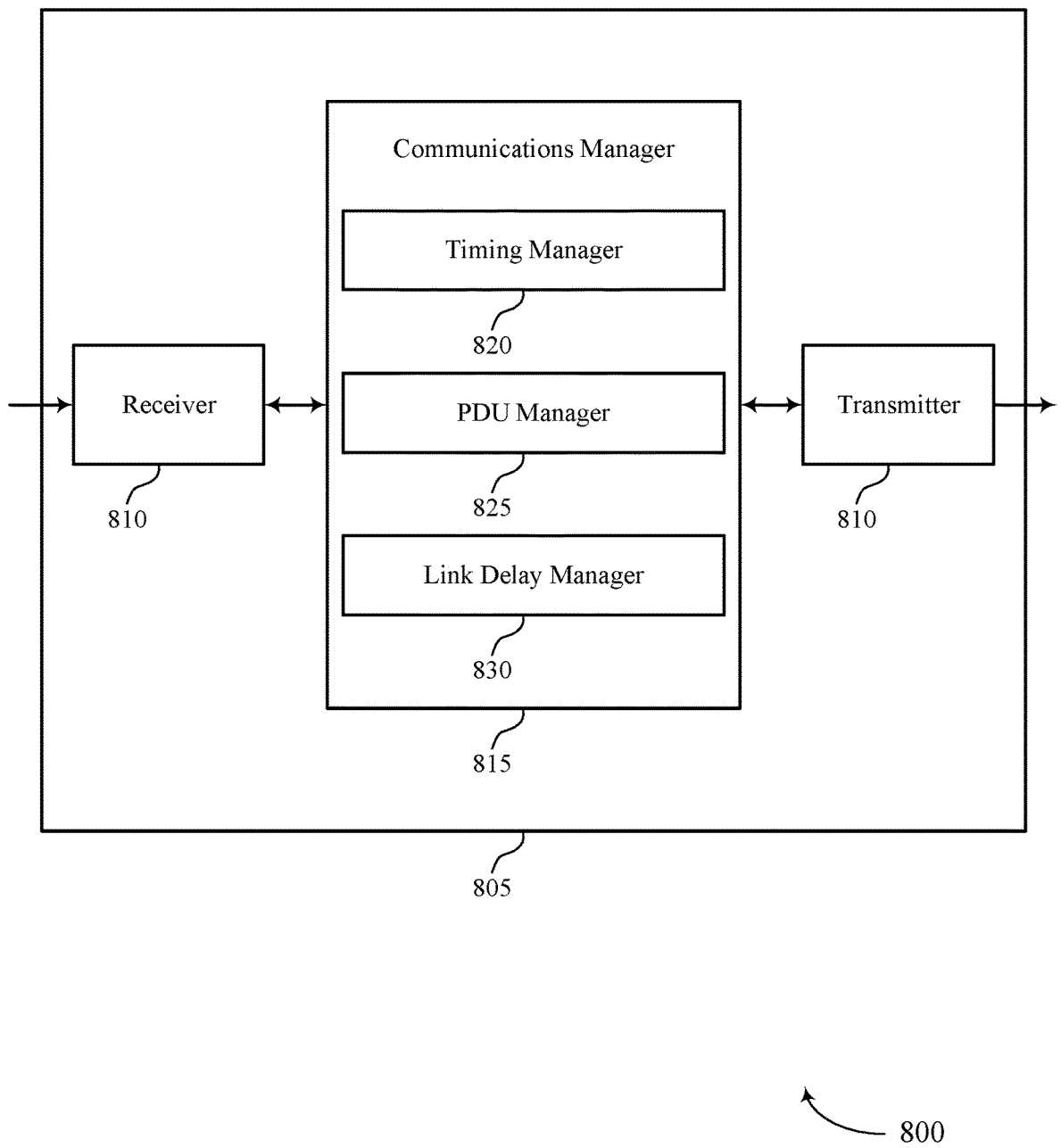

FIG. 8 shows a block diagram 800 of a wireless device 805 that supports wireless communication system timing synchronization in accordance with various aspects of the present disclosure. Wireless device 805 may be an example of aspects of a UE 115, an adaptor/translator 220, or a UPF 225 as described with reference to FIGS. 1, 2, and 4-7. Wireless device 805 may include receiver 810, communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to wireless transmission timing based on timing advance values in shortened transmission time interval transmissions, etc.). Information may be passed on to other components of wireless device 805. Receiver 810 may be an example of aspects of the transceiver 1035 described with reference to FIG. 10.

Communication manager 815 may be an example of aspects of the communication manager 715 and 1015 described with reference to FIGS. 7 and 10. Communication manager 815 may also include timing manager 820, PDU manager 825, and transmission parameter module 835.

Timing manager 820 may determine an ingress time for the PTP message received at the first node. In some examples, determining an ingress time for the PTP message for the wireless communication network is from a field in the PTP message overwritten with a value corresponding to the ingress time for the PTP message. Timing manager 820 may also determine an adjustment for a timing parameter associated with the PTP message based at least in part on the ingress time.

In some examples, timing manager 820 may determine an egress time for a second ethernet frame associated with the PTP message from the first node and determine a residence time correction for the ethernet frame comprising the PTP message time by subtracting the ingress time from the egress time. In other examples, timing manager 820 may identify one or more relevant timing domains for the wireless communication network based at least in part on the PTP message. Timing manager 820 may identify a network tag in a frame associated with the PTP message, wherein identifying the one or more timing domains is further based at least in part on the network tag. Timing manager 820 may also remove a timing domain from the one or more timing domains based at least in part on the PTP message.

PDU manager 825 may generate a PDU for transmission to a second node of the wireless communication network based at least in part on the first ethernet frame by overwriting a field in the PTP message with a value corresponding to the ingress time for the PTP message. PDU manager 825 may also overwrite a timestamp field of the Sync PTP message with the value corresponding to the ingress time. Alternatively, PDU manager 825 may overwrite a field of a header of the Sync PTP message with the value corresponding to the ingress time. PDU manager 825 may overwrite a TLV of the PTP message with the value corresponding to the ingress time.

In some examples, PDU manager 825 may provide an indication to the second node that an associated PDU session may carry PTP messages. In another example, PDU manager 825 may adjust the modified version of the PTP message by setting the overwritten field in the PTP message to a configured value. PDU manager 825 may generate a PDU for transmission to a second node of the wireless communication network based at least in part on adjusting a field of the PTP message according to a link delay.

In another example, PDU manager 825 may monitor one or more PDUs received from the second node for PTP messages based at least in part on the indicator that the PDU session supports PTP messages and identify a PTP message in a PDU of the one or more PDUs based at least in part on the monitoring.

Link delay manager 830 adjust the ingress time for the PTP message to account for a link delay associated with the PTP message. In some examples, link delay manager 830 may also determine a link delay time for the PTP message between transmission from the time sensitive network and reception by the first node.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
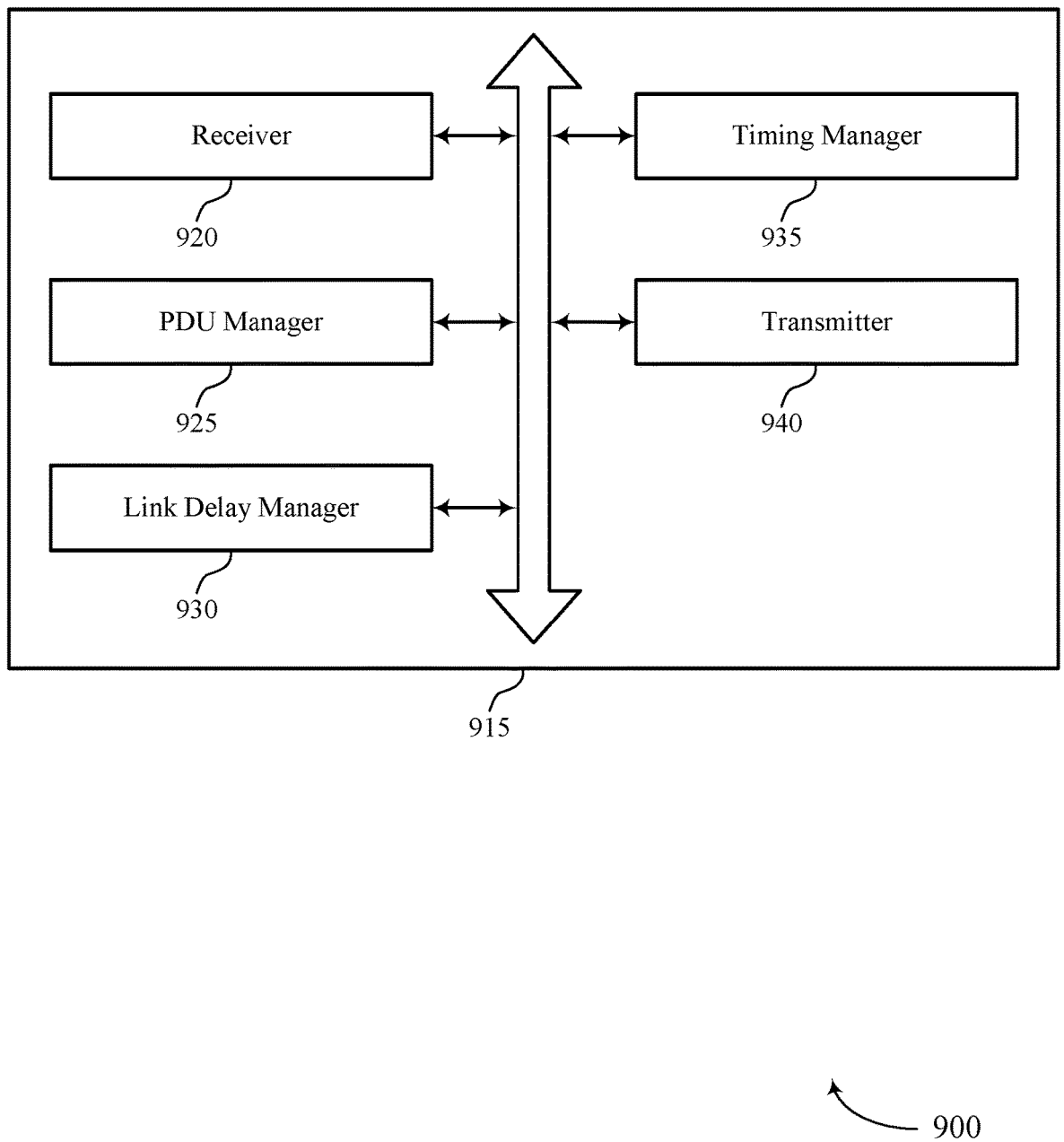
FIG. 9 shows a block diagram of a communications manager that supports wireless communication enhancements for transparent and boundary clocks in accordance with aspects of the present disclosure.

FIG. 9 shows a block diagram 900 of a communication manager 915 that supports wireless transmission timing based on timing advance values in shortened transmission time interval transmissions in accordance with various aspects of the present disclosure. The communication manager 915 may be an example of aspects of a communication manager 715, a communication manager 815, or a communication manager 1015 described with reference to FIGS. 7, 8, and 10. The communication manager 915 may include receiver 920. Each of these modules may communicate, directly or indirectly, with one another (e.g., via one or more buses).

The receiver 920 may receive a first ethernet frame including a PTP message. In some examples, the receiver 920 may receive, from a second node of the wireless communication network, a PDU including a PTP message. In some examples, the receiver 910 may receive, from a second node of the wireless communication network, a session connectivity message associated with a PDU session, the session connectivity message including an indicator that the PDU session supports PTP messages. For example, receiver 920 may establish a PDU session with a first UE for communication of PTP messages associated with one or more timing domains.

In some examples, the receiver 920 may receive a second ethernet frame including a second PTP message associated with the first PTP message. In some examples, the receiver 920 may receive, from a second node of the wireless communication network, a PDU associated with first and second ethernet frames received at the second node, the first ethernet frame including a first PTP message, and the second ethernet frame including a second PTP message. In some examples, the receiver 920 may receive, from a time sensitive network, an ethernet frame including a PTP message.

In some examples, the receiver 920 may receive, from one or more UEs served by the first node, an indicator of one or more timing domains to be supported by the one or more UEs. In some examples, the receiver 920 may receive an indication that a PDU session associated with the PTP message carries PTP messages. For example, receiver 920 may receive one or more indicators of a plurality of timing domains supported by the first UE. PTP messages for the plurality of timing domains may be communicated with the first UE via the PDU session. In some examples, the receiver 920 may receive an indicator of support of the second node for suppressing transmission of the first PTP message to the second node. In some examples, the receiver 910 may receive, from the second node, timing information for the one or more timing domains.

The timing manager 935 may determine an ingress time for the PTP message received at the first node. In some examples, the timing manager 935 may determine an ingress time for the PTP message for the wireless communication network from a field in the PTP message overwritten with a value corresponding to the ingress time for the PTP message. In some examples, the timing manager 935 may determine an adjustment for a timing parameter associated with the PTP message based on the ingress time. In some examples, the timing manager 935 may determine an ingress time for the first PTP message received at the second node based on the PDU.

In some examples, the timing manager 935 may determine an adjustment for a timing parameter of the second PTP message based on the ingress time. In some examples, the timing manager 935 may identify one or more relevant timing domains for the wireless communication network based on the PTP message. In some examples, the timing manager 935 may maintain a boundary clock for each of the one or more timing domains. In some examples, the timing manager 935 may determine an egress time for a second ethernet frame including the PTP message from the first node. In some examples, the timing manager 935 may determine a residence time correction for the ethernet frame including the PTP message time by subtracting the ingress time from the egress time.

In some examples, the timing manager 935 may determine an egress time for a third ethernet frame including a modified version of the first PTP message. In some examples, the timing manager 935 may identify a network tag in a frame associated with the PTP message, where identifying the one or more timing domains is further based on the network tag. In some examples, the timing manager 935 may remove a timing domain from the one or more timing domains based on the PTP message.

The timing manager 935 may determine which node, such as a UE, that a PTP packet should or should not be forwarded to based on the timing domains supported at the node. As described herein, a PTP packet arriving at a UE port may be considered an upstream packet. When an upstream packet reaches the wireless communications network, such as a 5G network, via a UE, the UE may send the timing domain association information in the packet to a UPF, adaptor, or translator. The UE may also send one or more indicators of the UE, or PDU session of the UE, to the UPF, adaptor, or translator. The timing domain association information can be included in a field of a header or a network tag associated with upstream PTP message. The field of the header may be, for example, a domainNumber field in a header of the PTP message. The domainNumber field may include a timing domain identifier. The network identifier may be a VLAN tag or one or more fields of a VLAN tag.

In informing the relevant node of the timing domain, or in determining which nodes to forward the PTP packet based on supported timing domains, several options are available. For example, the UE can record the timing domain association information and send the information to the UPF, adaptor, or translator. The UE may send the timing domain association information directly to the UPF, adaptor, or translator, or via a third node (e.g., via access and mobility management function (AMF), session management function (SMF), or policy control function (PCF)). Alternatively, the UE can send a representation of the upstream packet to a third node (e.g., AMF, gNB), which then sends the timing domain association information to the UPF, adaptor, or translator. In some examples, the representation of the upstream packet may include a copy of the upstream packet, a copy of portions of the upstream packet, or information from the upstream packet (e.g., one or more fields from the PTP message in the upstream packet). The third node may send the timing domain association information to the UPF, adaptor, or translator via one or more other nodes. Additionally or alternatively, the destination of the representation of the upstream packet may be a fourth node, and the third node may convey the representation to the fourth node. The fourth node may then extract the timing domain association information and send it to the UPF, adaptor, or translator. The UE may send the upstream packet to a node of the wireless communication network associated with a destination of the packet (e.g., the UPF, adaptor, or translator).

On receiving a downstream packet, the UPF, adaptor, or translator may use the timing domain association information received from one or more UEs to determine the set of UEs or UE PDU sessions to which the packet should be forwarded.

In some examples, the timing manager 935 may identify one or more timing domains based on identifying a network tag in a frame associated with the PTP message. In another example, the timing manager 935 identifies the one or more timing domains from a field in a header of the PTP.

The PDU manager 925 may generate a PDU for transmission to a second node of the wireless communication network based on the first ethernet frame by overwriting a field in the PTP message with a value corresponding to the ingress time for the PTP message. In some examples, the PDU manager 925 may monitor one or more PDUs received from the second node for PTP messages based on the indicator that the PDU session supports PTP messages. In some examples, the PDU manager 925 may identify a PTP message in a PDU of the one or more PDUs based on the monitoring.

In some examples, the PDU manager 925 may generate a PDU for transmission to a second node of the wireless communication network based on the second ethernet frame, the PDU including a value corresponding to the ingress time for the first PTP message. In some examples, the PDU manager 925 may generate a PDU for transmission to a second node of the wireless communication network based on adjusting a field of the PTP message according to a link delay.

In some examples, the PDU manager 925 may overwrite a timestamp field of the Sync PTP message with the value corresponding to the ingress time. In some examples, the PDU manager 925 may overwrite a field of a header of the Sync PTP message with the value corresponding to the ingress time. In some examples, the PDU manager 925 may overwrite a type linked value (TLV) of the PTP message with the value corresponding to the ingress time.

In some examples, the PDU manager 925 may provide an indication to the second node that an associated PDU session may carry PTP messages. In some examples, the PDU manager 925 may adjust the modified version of the PTP message by setting the overwritten field in the PTP message to a configured value. In some examples, the PDU manager 925 may generate the PDU by inserting a value corresponding to the ingress time for the PTP message. In some examples, the PDU manager 925 may append the value corresponding to the ingress time for the first PTP message to the second ethernet frame in the PDU.

In some examples, the PDU manager 925 may modify the second ethernet frame by overwriting a timestamp field of the second PTP message with the value corresponding to the ingress time. In some examples, the PDU manager 925 may modify the second ethernet frame by overwriting a field of a header of the second PTP message with the value corresponding to the ingress time. In some examples, the PDU manager 925 may modify the second ethernet frame by overwriting a type linked value (TLV) of the second PTP message with the value corresponding to the ingress time.

In some examples, the PDU manager 925 may adjust the ingress time for the PTP message to account for a link delay associated with the PTP message. In some examples, the PDU manager 925 may suppress transmission of the first PTP message to the second node. In some examples, the PDU manager 925 may adjust the modified version of the second PTP message by setting the overwritten field in the PTP message to a configured value.

The transmitter 940 may send the PDU to the second node. The PDU may include the PTP message. In some examples, the transmitter 940 may transmit, to a second node of the wireless communication network, a session connectivity message associated with a PDU session for conveying the frame, the session connectivity message including an indicator that the PDU session supports PTP messages.

In some examples, the transmitter 940 may transmit, for each timing domain of the one or more timing domains, an identifier of the timing domain and timing information associated with the timing domain. In some examples, the transmitter 940 may signal that the first node can filter Sync messages associated with the PTP message. In some examples, transmitting the second ethernet frame to a time sensitive network, where the second ethernet frame includes a modified version of the PTP message.

In some examples, the transmitter 940 may transmit the second ethernet frame to a time sensitive network, where a correction field of the modified version of the PTP message is adjusted by the residence time correction. In some examples, the transmitter 940 may provide an indication to the second node that an associated PDU session may carry PTP messages. In some examples, the transmitter 940 may signal that the first node can filter Sync messages associated with the PTP message.

In some examples, the transmitter 940 may transmit the third ethernet frame including a modified version of the second PTP message that identifies an adjustment to a time sensitive network, where a correction field of the modified version of the second PTP message is modified using the residence time correction. In some examples, the transmitter 940 may send a second PTP message to a node of a time sensitive network associated with a timing domain of the one or more timing domains based on the respective boundary clock associated with the timing domain.

In some examples, the transmitter 940 may transmit, to a second node of the wireless communication network, an indicator of the network tag with the identifier of the timing domain. In some examples, the transmitter 940 may send a PDU to the third node including a modified version of the PTP message based on the timing domain being one of the one or more timing domains. The link delay manager 930 may determine a link delay time for the PTP message between transmission from the time sensitive network and reception by the first node. In some examples, the link delay manager 930 may adjust the ingress time for the PTP message to account for a link delay associated with the PTP message.

In some examples, the receiver 920 may receive a PTP message associated with a destination, wherein a second node of the wireless communication network serves as a packet gateway for the destination for the wireless communication network. The transmitter 940 may send the PTP message to a second node and send a representation of the PTP message to a third node of the wireless communications network. For example, the transmitter 940 may forward the PTP message to the third node. The representation of the PTP message may be sent via a control plane message or a user plane message. In some examples, the third node is one of an AMF, UPF, or a base station.

In some examples, the receiver 920 may receive, from additional nodes of the wireless communication network, indicators of one or more timing domains supported by the additional nodes. The receiver 920 may also receive a PTP message associated with a timing domain. The transmitter 940 may send the PTP message to a subset of the additional nodes based at least in a part on the indicators of one or more timing domains supported by the additional nodes. The additional nodes may include one or more UEs.

In some examples, the receiver 920 may receive a message from a third node. The PDU manager 925 may determine that the PDU session supports PTP messages based at least in part on the message from the third node. In some examples, the message from the third node indicates subscription information associated with the second node. For example, the third node may have subscription information association with the second node.

Figure 10:
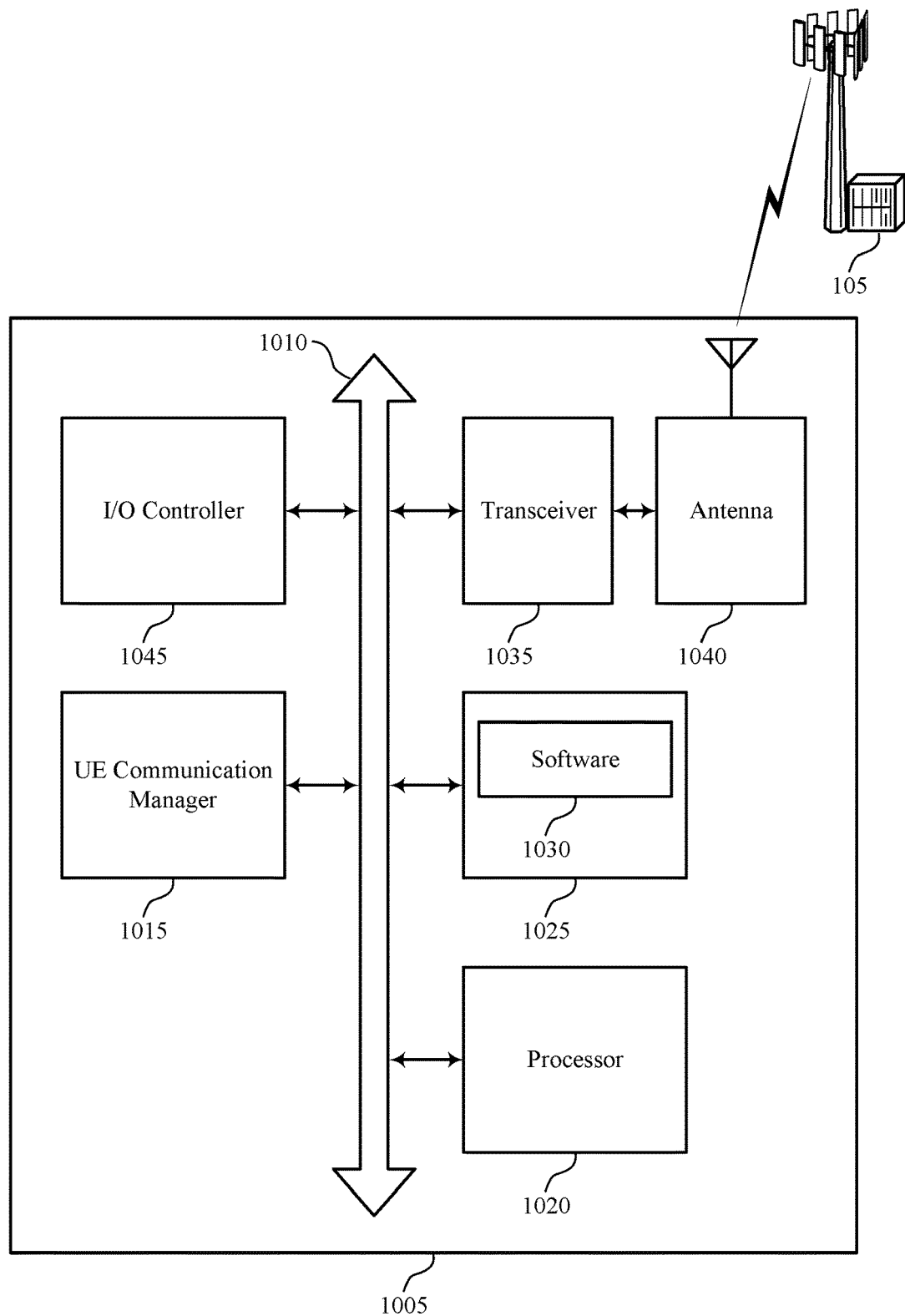
FIG. 10 shows a block diagram of a wireless device that supports wireless communication enhancements for transparent and boundary clocks in accordance with aspects of the present disclosure.

FIG. 10 shows a diagram of a system 1000 including a device 1005 that supports wireless transmission timing based on timing advance values in shortened transmission time interval transmissions in accordance with various aspects of the present disclosure. Device 1005 may be an example of or include the components of wireless device 705, wireless device 805, or a UE 115 as described above, e.g., with reference to FIGS. 1, 7, and 8. Device 1005 may include components for bi-directional voice and data communications including components for transmitting and receiving communications, including Communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

The communications manager 1010 may receive a first ethernet frame including a PTP message, determine an ingress time for the PTP message received at the first node, generate a PDU for transmission to a second node of the wireless communication network based on the first ethernet frame by overwriting a field in the PTP message with a value corresponding to the ingress time for the PTP message, and send the PDU to the second node.

The communications manager 1010 may also receive, from a second node of the wireless communication network, a PDU including a PTP message, determine an ingress time for the PTP message for the wireless communication network from a field in the PTP message overwritten with a value corresponding to the ingress time for the PTP message, and determine an adjustment for a timing parameter associated with the PTP message based on the ingress time.

The communications manager 1010 may also receive a frame including a PTP message, transmit, to a second node of the wireless communication network, a session connectivity message associated with a PDU session for conveying the frame, the session connectivity message including an indicator that the PDU session supports PTP messages, and send, to the second node, a PDU including the PTP message.

The communications manager 1010 may also receive, from a second node of the wireless communication network, a session connectivity message associated with a PDU session, the session connectivity message including an indicator that the PDU session supports PTP messages, monitor one or more PDUs received from the second node for PTP messages based on the indicator that the PDU session supports PTP messages, and identify a PTP message in a PDU of the one or more PDUs based on the monitoring.

The communications manager 1010 may also receive, at a first node of a wireless communication network, a first ethernet frame including a first PTP message, receive a second ethernet frame including a second PTP message associated with the first PTP message, determine an ingress time for the first PTP message received at the first node, generate a PDU for transmission to a second node of the wireless communication network based on the second ethernet frame, the PDU including a value corresponding to the ingress time for the first PTP message, and transmit the PDU to the second node.

The communications manager 1010 may also receive, from a second node of the wireless communication network, a PDU associated with first and second ethernet frames received at the second node, the first ethernet frame including a first PTP message, and the second ethernet frame including a second PTP message, determine an ingress time for the first PTP message received at the second node based on the PDU, and determine an adjustment for a timing parameter of the second PTP message based on the ingress time.

The communications manager 1010 may also receive, from a time sensitive network, an ethernet frame including a PTP message, determine a link delay time for the PTP message between transmission from the time sensitive network and reception by the first node, generate a PDU for transmission to a second node of the wireless communication network based on adjusting a field of the PTP message according to a link delay, transmit the PDU to the second node, receive a PTP message, identify one or more relevant timing domains for the wireless communication network based on the PTP message, and maintain a boundary clock for each of the one or more timing domains.

The communications manager 1010 may also receive, from one or more UEs served by the first node, an indicator of one or more timing domains to be supported by the one or more UEs and transmit, for each timing domain of the one or more timing domains, an identifier of the timing domain and timing information associated with the timing domain.

The communications manager 1010 may also receive, from a second node of the wireless communication network, an indicator of one or more timing domains supported by a third node of the wireless communication network. The communications manager 1010 may also process one or more PTP messages associated with a PDU session according to the one or more timing domains supported by the third node. In some examples, the second and third nodes may be a same node.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting wireless communication system enhancements for transparent and boundary clocks).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
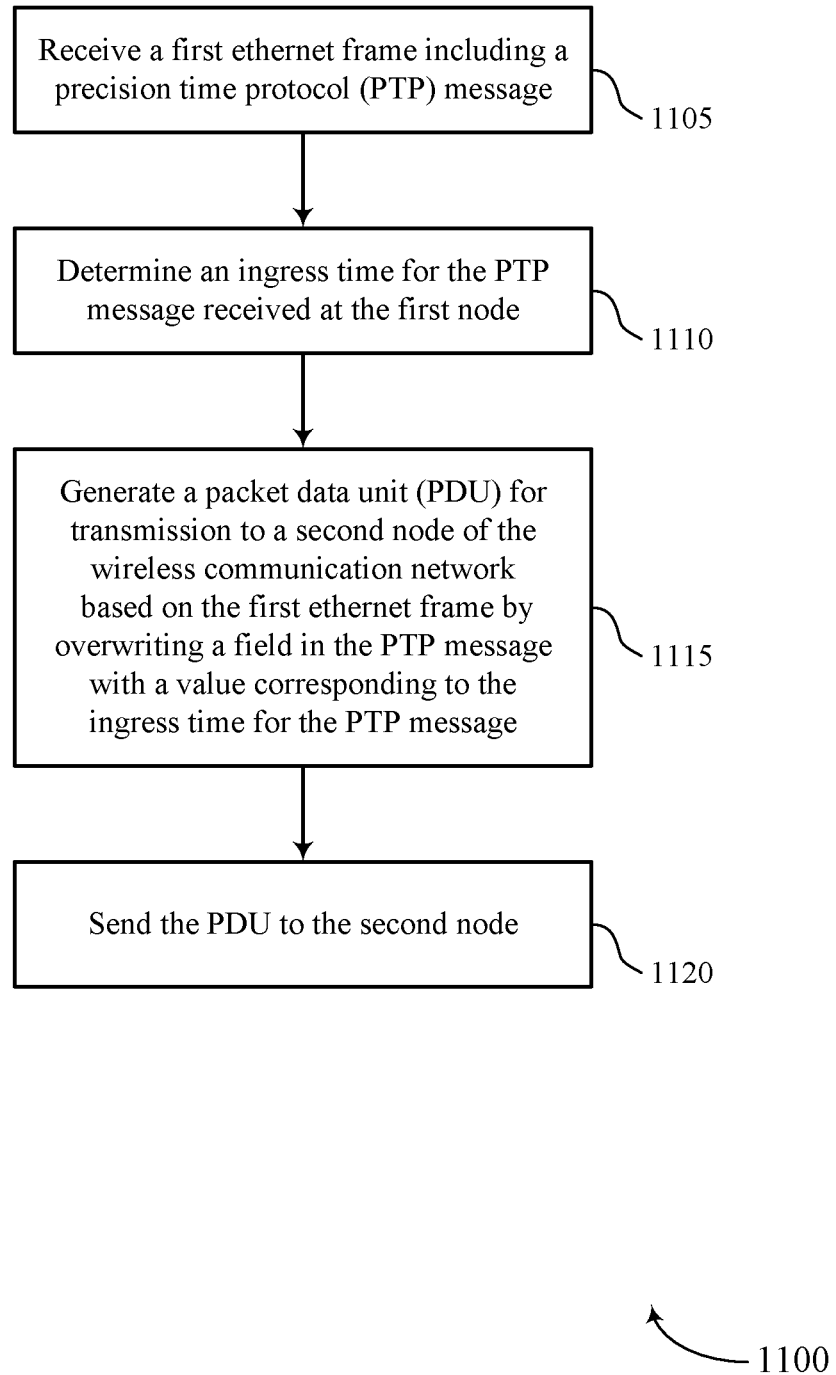
FIGS. 11 through 26 show flowcharts illustrating methods that support wireless communication enhancements for transparent and boundary clocks in accordance with aspects of the present disclosure.

FIG. 11 shows a flowchart illustrating a method 1100 that supports wireless communication system enhancements for transparent and boundary clocks in accordance with aspects of the present disclosure. The operations of method 1100 may be implemented by a UE 115, a UPF, or associated components as described herein. For example, the operations of method 1100 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1105, the UE or UPF may receive a first ethernet frame including a PTP message. The operations of 1105 may be performed according to the methods described herein. In some examples, aspects of the operations of 1105 may be performed by a receiver as described with reference to FIGS. 7 through 10.

At 1110, the UE or UPF may determine an ingress time for the PTP message received at the first node. The operations of 1110 may be performed according to the methods described herein. In some examples, aspects of the operations of 1110 may be performed by a timing manager as described with reference to FIGS. 7 through 10.

At 1115, the UE or UPF may generate a PDU for transmission to a second node of the wireless communication network based on the first ethernet frame by overwriting a field in the PTP message with a value corresponding to the ingress time for the PTP message. The operations of 1115 may be performed according to the methods described herein. In some examples, aspects of the operations of 1115 may be performed by a PDU manager as described with reference to FIGS. 7 through 10.

At 1120, the UE or UPF may send the PDU to the second node. The operations of 1120 may be performed according to the methods described herein. In some examples, aspects of the operations of 1120 may be performed by a transmitter as described with reference to FIGS. 7 through 10.

Figure 12:
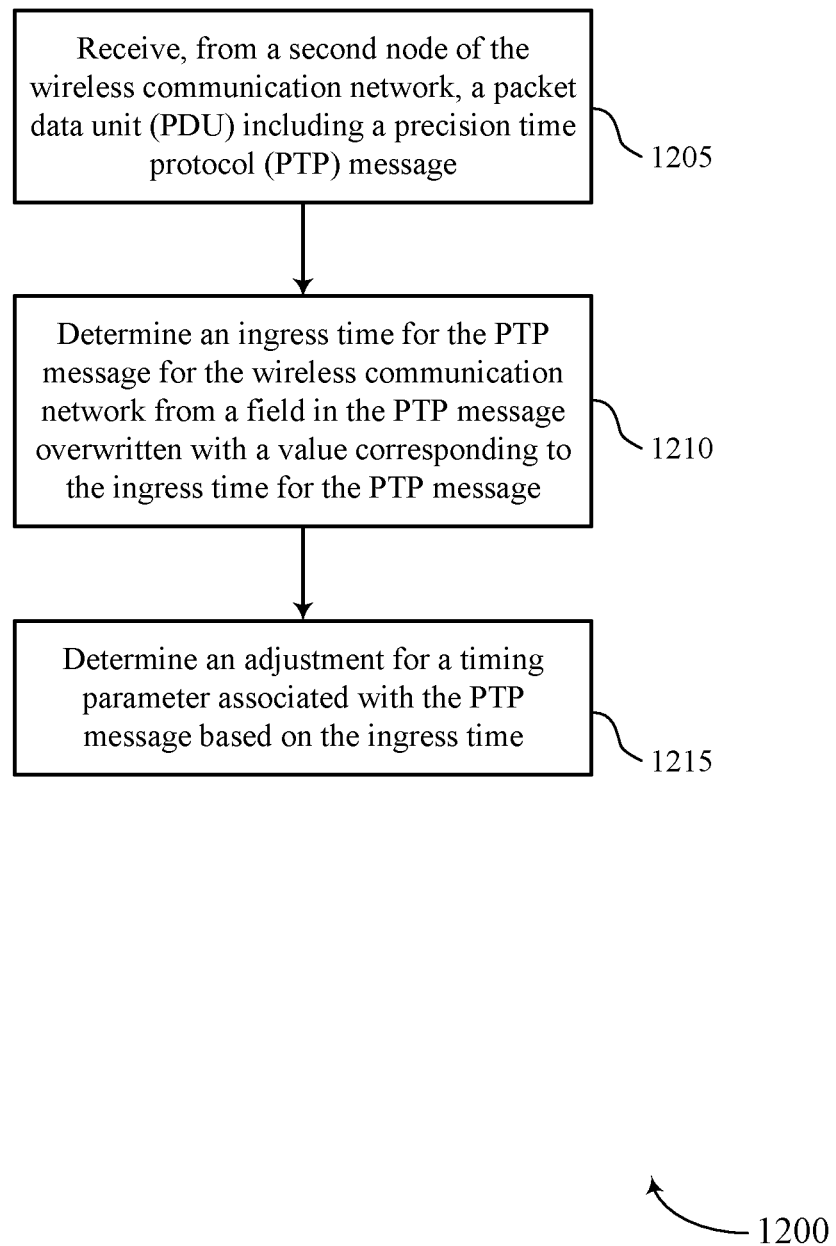

FIG. 12 shows a flowchart illustrating a method 1200 that supports wireless communication system enhancements for transparent and boundary clocks in accordance with aspects of the present disclosure. The operations of method 1200 may be implemented by a UE 115, a UPF, or associated components as described herein. For example, the operations of method 1200 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1205, the UE or UPF may receive, from a second node of the wireless communication network, a PDU including a PTP message. The operations of 1205 may be performed according to the methods described herein. In some examples, aspects of the operations of 1205 may be performed by a receiver as described with reference to FIGS. 7 through 10.

At 1210, the UE or UPF may determine an ingress time for the PTP message for the wireless communication network from a field in the PTP message overwritten with a value corresponding to the ingress time for the PTP message. The operations of 1210 may be performed according to the methods described herein. In some examples, aspects of the operations of 1210 may be performed by a timing manager as described with reference to FIGS. 7 through 10.

At 1215, the UE or UPF may determine an adjustment for a timing parameter associated with the PTP message based on the ingress time. The operations of 1215 may be performed according to the methods described herein. In some examples, aspects of the operations of 1215 may be performed by a timing manager as described with reference to FIGS. 7 through 10.

Figure 13:
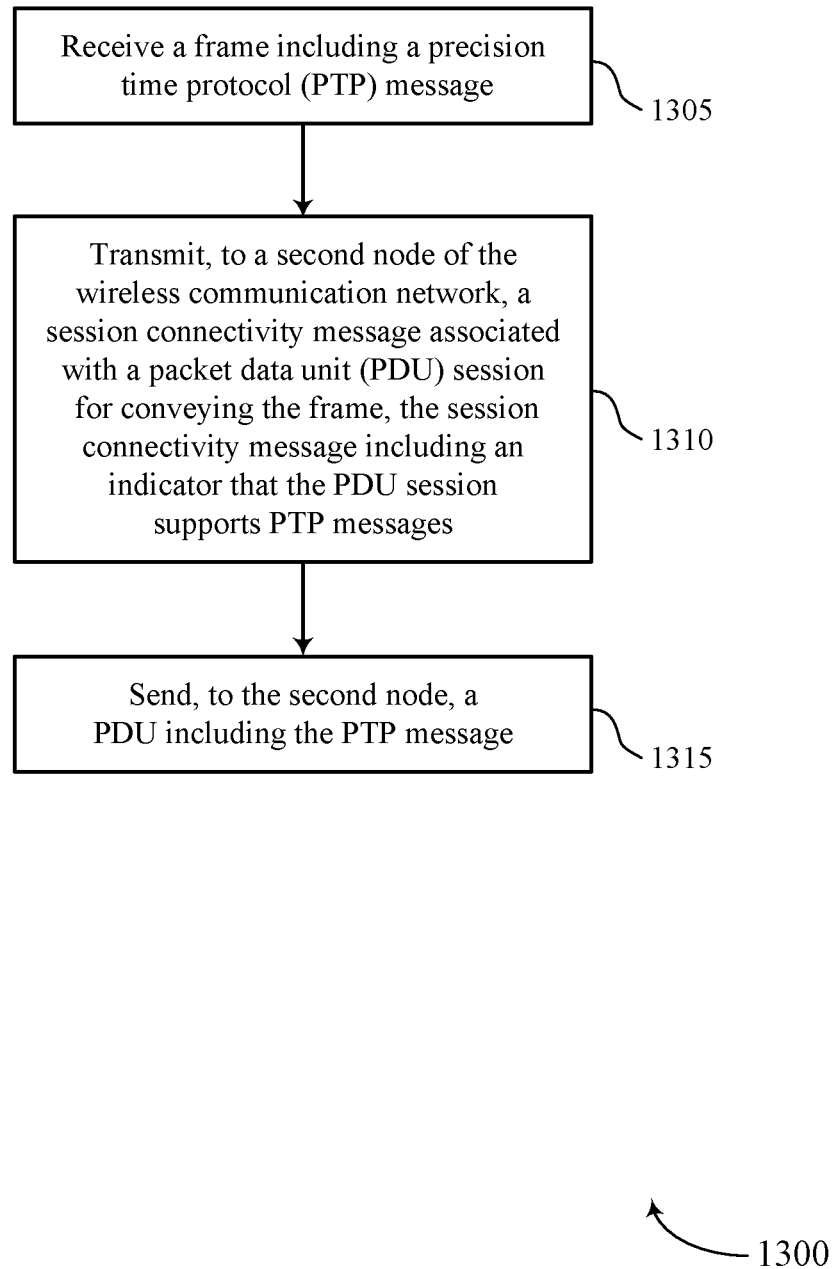

FIG. 13 shows a flowchart illustrating a method 1300 that supports wireless communication system enhancements for transparent and boundary clocks in accordance with aspects of the present disclosure. The operations of method 1300 may be implemented by a UE 115, a UPF, or associated components as described herein. For example, the operations of method 1300 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1305, the UE or UPF may receive a frame including a PTP message. The operations of 1305 may be performed according to the methods described herein. In some examples, aspects of the operations of 1305 may be performed by a receiver as described with reference to FIGS. 7 through 10.

At 1310, the UE or UPF may transmit, to a second node of the wireless communication network, a session connectivity message associated with a PDU session for conveying the frame, the session connectivity message including an indicator that the PDU session supports PTP messages. The operations of 1310 may be performed according to the methods described herein. In some examples, aspects of the operations of 1310 may be performed by a transmitter as described with reference to FIGS. 7 through 10.

At 1315, the UE or UPF may send, to the second node, a PDU including the PTP message. The operations of 1315 may be performed according to the methods described herein. In some examples, aspects of the operations of 1315 may be performed by a transmitter as described with reference to FIGS. 7 through 10.

Figure 14:
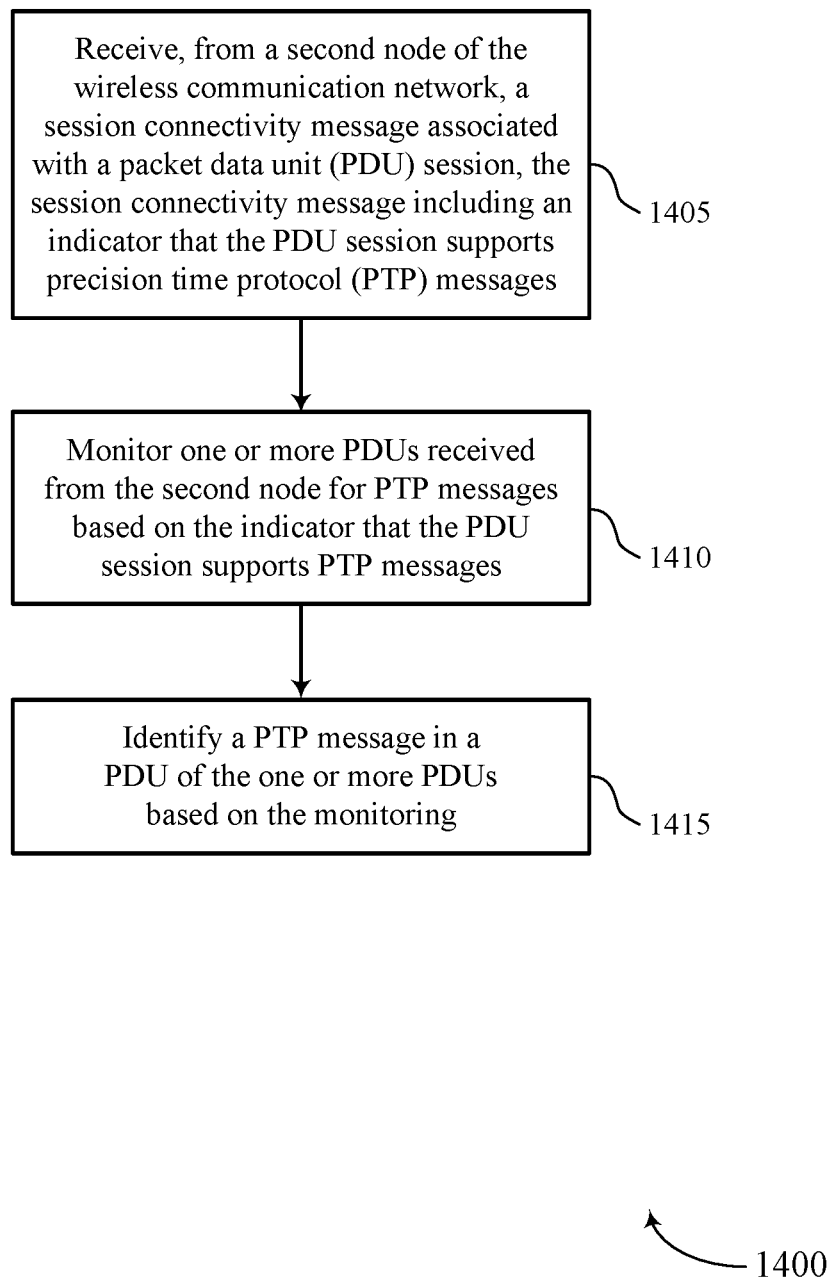

FIG. 14 shows a flowchart illustrating a method 1400 that supports wireless communication system enhancements for transparent and boundary clocks in accordance with aspects of the present disclosure. The operations of method 1400 may be implemented by a UE 115, a UPF, or associated components as described herein. For example, the operations of method 1400 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1405, the UE or UPF may receive, from a second node of the wireless communication network, a session connectivity message associated with a PDU session, the session connectivity message including an indicator that the PDU session supports PTP messages. The operations of 1405 may be performed according to the methods described herein. In some examples, aspects of the operations of 1405 may be performed by a receiver as described with reference to FIGS. 7 through 10.

At 1410, the UE or UPF may monitor one or more PDUs received from the second node for PTP messages based on the indicator that the PDU session supports PTP messages. The operations of 1410 may be performed according to the methods described herein. In some examples, aspects of the operations of 1410 may be performed by a PDU manager as described with reference to FIGS. 7 through 10.

At 1415, the UE or UPF may identify a PTP message in a PDU of the one or more PDUs based on the monitoring. The operations of 1415 may be performed according to the methods described herein. In some examples, aspects of the operations of 1415 may be performed by a PDU manager as described with reference to FIGS. 7 through 10.

Figure 15:
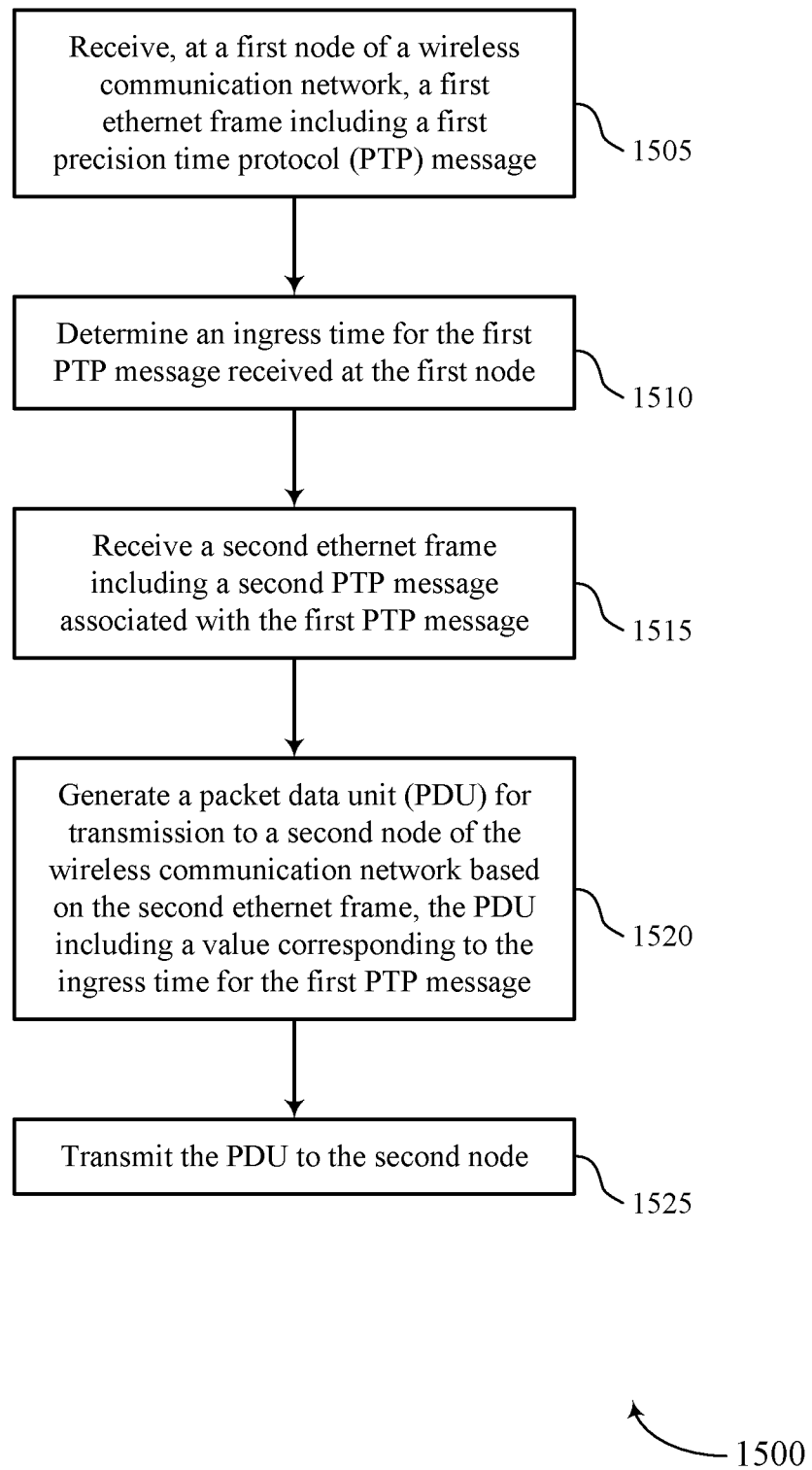

FIG. 15 shows a flowchart illustrating a method 1500 that supports wireless communication system enhancements for transparent and boundary clocks in accordance with aspects of the present disclosure. The operations of method 1500 may be implemented by a UE 115, a UPF, or associated components as described herein. For example, the operations of method 1500 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1505, the UE or UPF may receive, at a first node of a wireless communication network, a first ethernet frame including a first PTP message. The operations of 1505 may be performed according to the methods described herein. In some examples, aspects of the operations of 1505 may be performed by a receiver as described with reference to FIGS. 7 through 10.

At 1510, the UE or UPF may determine an ingress time for the first PTP message received at the first node. The operations of 1510 may be performed according to the methods described herein. In some examples, aspects of the operations of 1510 may be performed by a timing manager as described with reference to FIGS. 7 through 10.

At 1515, the UE or UPF may receive a second ethernet frame including a second PTP message associated with the first PTP message. The second ethernet frame may be a Follow_Up PTP message associated with a Sync PTP message. The operations of 1515 may be performed according to the methods described herein. In some examples, aspects of the operations of 1515 may be performed by a receiver as described with reference to FIGS. 7 through 10.

At 1520, the UE or UPF may generate a PDU for transmission to a second node of the wireless communication network based on the second ethernet frame, the PDU including a value corresponding to the ingress time for the first PTP message. The operations of 1520 may be performed according to the methods described herein. In some examples, aspects of the operations of 1520 may be performed by a PDU manager as described with reference to FIGS. 7 through 10.

At 1525, the UE or UPF may transmit the PDU to the second node. The operations of 1525 may be performed according to the methods described herein. In some examples, aspects of the operations of 1525 may be performed by a transmitter as described with reference to FIGS. 7 through 10.

Figure 16:
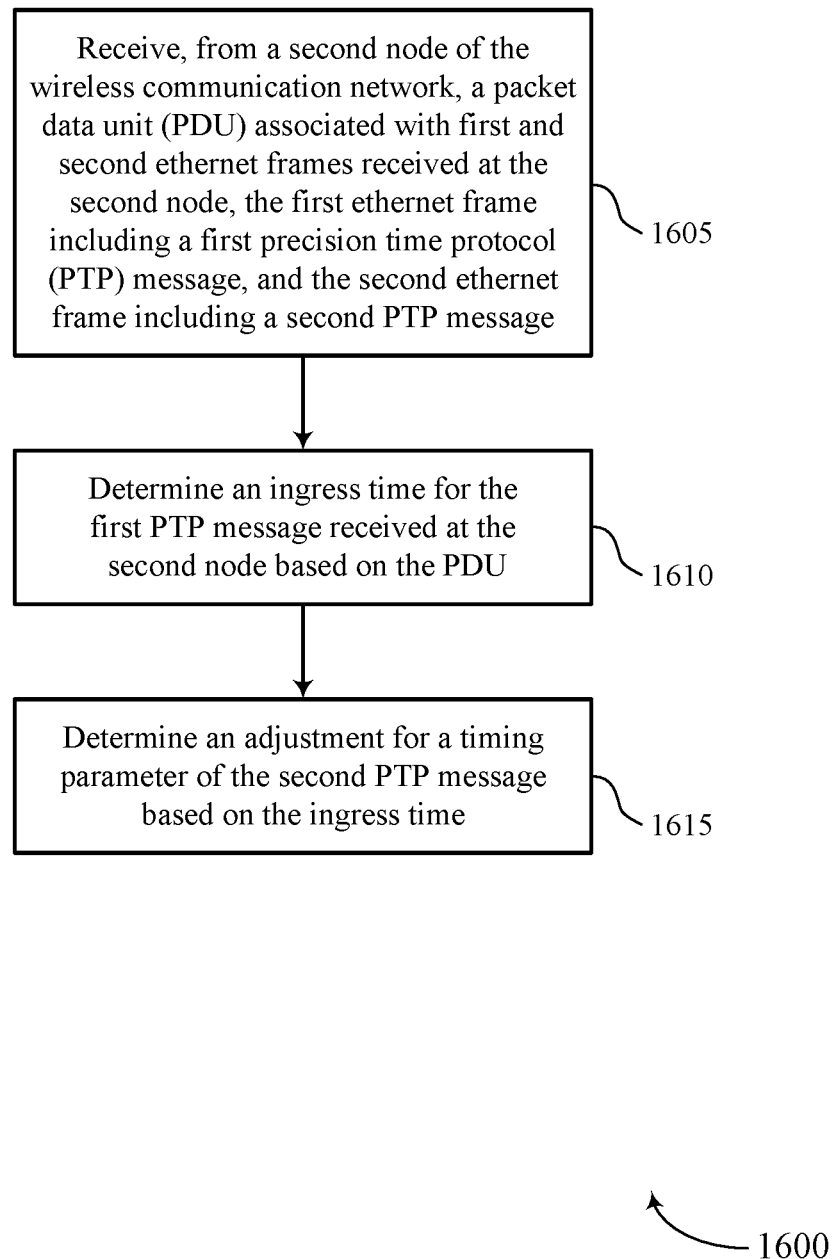

FIG. 16 shows a flowchart illustrating a method 1600 that supports wireless communication system enhancements for transparent and boundary clocks in accordance with aspects of the present disclosure. The operations of method 1600 may be implemented by a UE 115, a UPF, or associated components as described herein. For example, the operations of method 1600 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1605, the UE or UPF may receive, from a second node of the wireless communication network, a PDU associated with first and second ethernet frames received at the second node, the first ethernet frame including a first PTP message, and the second ethernet frame including a second PTP message. The operations of 1605 may be performed according to the methods described herein. In some examples, aspects of the operations of 1605 may be performed by a receiver as described with reference to FIGS. 7 through 10.

At 1610, the UE or UPF may determine an ingress time for the first PTP message received at the second node based on the PDU. The operations of 1610 may be performed according to the methods described herein. In some examples, aspects of the operations of 1610 may be performed by a timing manager as described with reference to FIGS. 7 through 10.

At 1615, the UE or UPF may determine an adjustment for a timing parameter of the second PTP message based on the ingress time. The operations of 1615 may be performed according to the methods described herein. In some examples, aspects of the operations of 1615 may be performed by a timing manager as described with reference to FIGS. 7 through 10.

In some examples, method 1600 may further include using the ingress timestamp as an ingress time for a residence time computation using additional information such as a reception time at a wireless communication system egress point. In some examples, method 1600 may include optionally send an ethernet frame associated with the first ethernet PDU outside wireless communication system after setting originTimeStamp in the PTP message associated with the PDU based on preciseOriginTimeStamp in the second PTP message (e.g., Follow_Up message) and the residence time computation. Some examples may include sending an ethernet frame associated with the second ethernet PDU outside wireless communication system after either removing any appended ingress timestamp from the ethernet frame if the ingress timestamp is appended to the ethernet frame or setting a field in the second PTP message containing ingress timestamp to a configured value (e.g., zero) if a field in the PTP message is used to send ingress timestamp. Method 16 may also send an ethernet frame after adjusting (e.g., adding or subtracting) a correction field in the second PTP message based on the residence time computation or adjusting (e.g., adding or subtracting) a preciseOriginTimeStamp field in the second PTP message based on the residence time computation.

Figure 17:
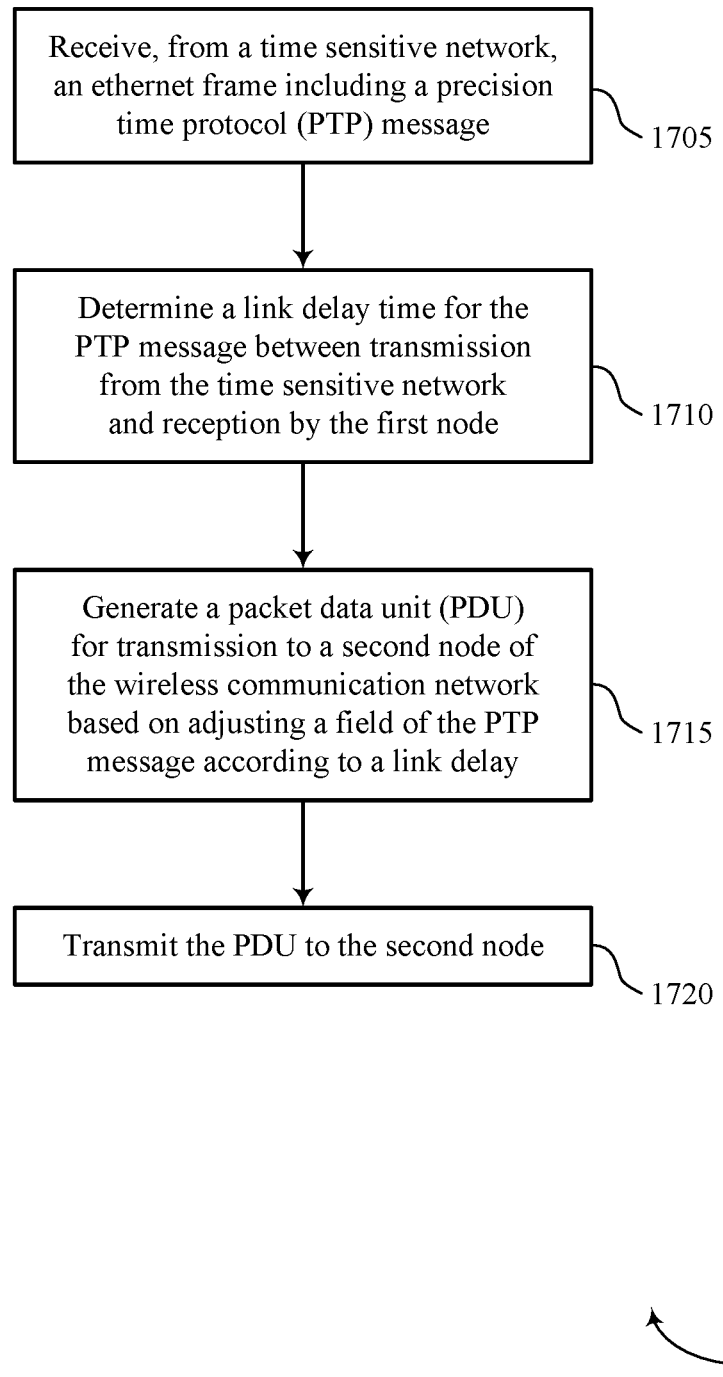

FIG. 17 shows a flowchart illustrating a method 1700 that supports wireless communication system enhancements for transparent and boundary clocks in accordance with aspects of the present disclosure. The operations of method 1700 may be implemented by a UE 115, a UPF, or associated components as described herein. For example, the operations of method 1700 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware. In some examples, a wireless communication system acting as a peer-to-peer transparent clock may need to correct for a delay of an incoming link associated with a PTP message.

At 1705, the UE or UPF may receive, from a time sensitive network, an ethernet frame including a PTP message. The operations of 1705 may be performed according to the methods described herein. In some examples, aspects of the operations of 1705 may be performed by a receiver as described with reference to FIGS. 7 through 10.

At 1710, the UE or UPF may determine a link delay time for the PTP message between transmission from the time sensitive network and reception by the first node. In some examples, the link delay time can be determined using a peer delay mechanism. The operations of 1710 may be performed according to the methods described herein. In some examples, aspects of the operations of 1710 may be performed by a link delay manager as described with reference to FIGS. 7 through 10.

At 1715, the UE or UPF may generate a PDU for transmission to a second node of the wireless communication network based on adjusting a field of the PTP message according to a link delay. The operations of 1715 may be performed according to the methods described herein. In some examples, aspects of the operations of 1715 may be performed by a PDU manager as described with reference to FIGS. 7 through 10.

At 1720, the UE or UPF may transmit the PDU to the second node. The operations of 1720 may be performed according to the methods described herein. In some examples, aspects of the operations of 1720 may be performed by a transmitter as described with reference to FIGS. 7 through 10.

Figure 18:
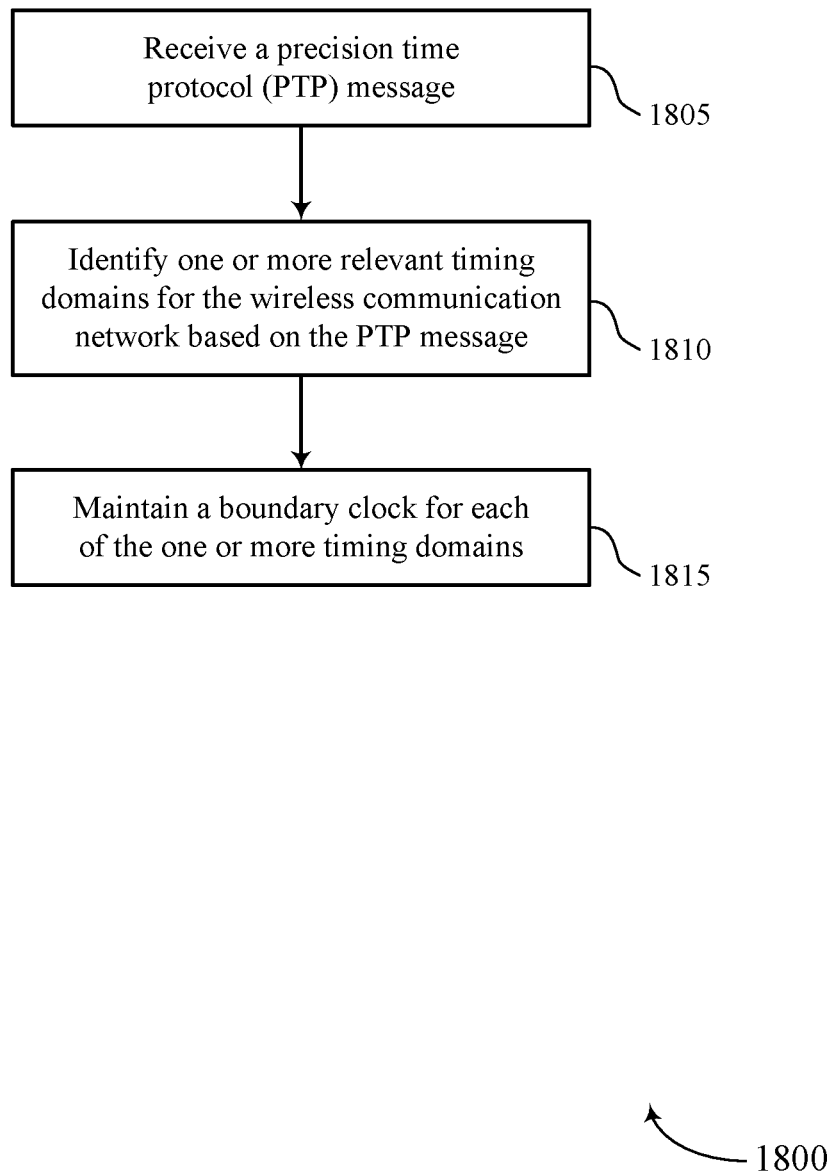

FIG. 18 shows a flowchart illustrating a method 1800 that supports wireless communication system enhancements for transparent and boundary clocks in accordance with aspects of the present disclosure. The operations of method 1800 may be implemented by a UE 115, a UPF, or associated components as described herein. For example, the operations of method 1800 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1805, the UE or UPF may receive a PTP message. The operations of 1805 may be performed according to the methods described herein. In some examples, aspects of the operations of 1805 may be performed by a receiver as described with reference to FIGS. 7 through 10.

At 1810, the UE or UPF may identify one or more relevant timing domains for the wireless communication network based on the PTP message. The operations of 1810 may be performed according to the methods described herein. In some examples, aspects of the operations of 1810 may be performed by a timing manager as described with reference to FIGS. 7 through 10.

At 1815, the UE or UPF may maintain a boundary clock for each of the one or more timing domains. The operations of 1815 may be performed according to the methods described herein. In some examples, aspects of the operations of 1815 may be performed by a timing manager as described with reference to FIGS. 7 through 10.

Figure 19:
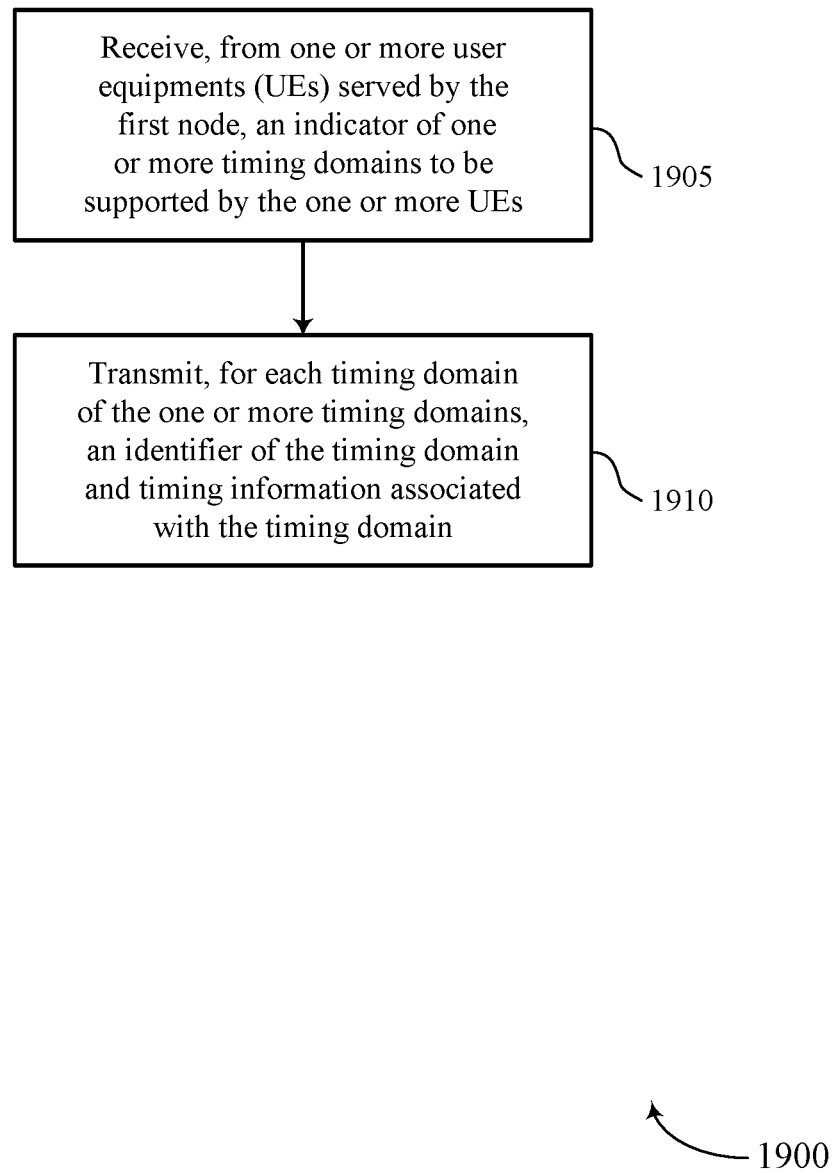

FIG. 19 shows a flowchart illustrating a method 1900 that supports wireless communication system enhancements for transparent and boundary clocks in accordance with aspects of the present disclosure. The operations of method 1900 may be implemented by a UE 115, a UPF, or associated components as described herein. For example, the operations of method 1900 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 1905, the UE or UPF may receive, from one or more UEs served by the first node, an indicator of one or more timing domains to be supported by the one or more UEs. The operations of 1905 may be performed according to the methods described herein. In some examples, aspects of the operations of 1905 may be performed by a receiver as described with reference to FIGS. 7 through 10.

At 1910, the UE or UPF may transmit, for each timing domain of the one or more timing domains, an identifier of the timing domain and timing information associated with the timing domain. The operations of 1910 may be performed according to the methods described herein. In some examples, aspects of the operations of 1910 may be performed by a transmitter as described with reference to FIGS. 7 through 10.

In some examples, the UE or UPF may identify relevant timing domains by tracking timing domain information in received PTP messages and optionally tracking corresponding VLAN tags associated with ethernet packets containing the PTP messages. The UE or UPF may save the domain information in a received PTP message contained in domainNumber field in header of the PTP message. Specific examples for timing domain information in PTP messages may include that the UE may save domain information in a Pdelay_req message contained in domainNumber field in header of the Pdelay_req message or that UE may save domain information in a Announce message contained in domainNumber field in header of the Announce message. A timing domain may be removed from a list of relevant timing domains if the associated timing domain is not part of any PTP messages for a duration greater than Timing-Domain_TimeoutDuration.

In some examples, the UE or UPF may act as a boundary clock for each of a subset of identified timing domains. In other examples, the UE or UPF may act as a boundary clock for each of a subset of combination of identified timing domains and corresponding VLAN tags. This functionality can be performed at the UE or at an adaptor/translator connected to the UE.

With multiple timing domains, wireless communication system may act as a boundary clock for each timing domain and RAN broadcasts timing information (e.g., an offset with respect to a 5G clock known to the RAN and the UE) associated with each such timing domain. Timing domains may also be confined by VLAN tags used for associated ethernet packets and frames. For example, two different timing domains may use same timing domain identifier in PTP messages (e.g., in domainNumber field) and but different VLAN tags in associated ethernet packet/frames.

The RAN may indicate timing domain information for each broadcasted timing domain including associated VLAN information because, for each timing domain for which the RAN sends timing information, the RAN additionally indicates (e.g., via a SIB or a unicast RRC message) a timing domain information including a timing domain identifier and optional VLAN information (e.g., VLAN Identifier or VID) based on VLAN tags associated with PTP messages received by RAN. The UE tracks a subset of timing information sent by the RAN and the UE saves the timing domain information associated with each of the subset of timing information sent by RAN and optionally runs PTP master clock based on the timing information and associated timing domain information. For instance, the PTP master clock uses same domainNumber in sent PTP messages or the PTP master clock uses same VLAN information (e.g., VID) in sent ethernet packets with PTP messages.

Figure 20:
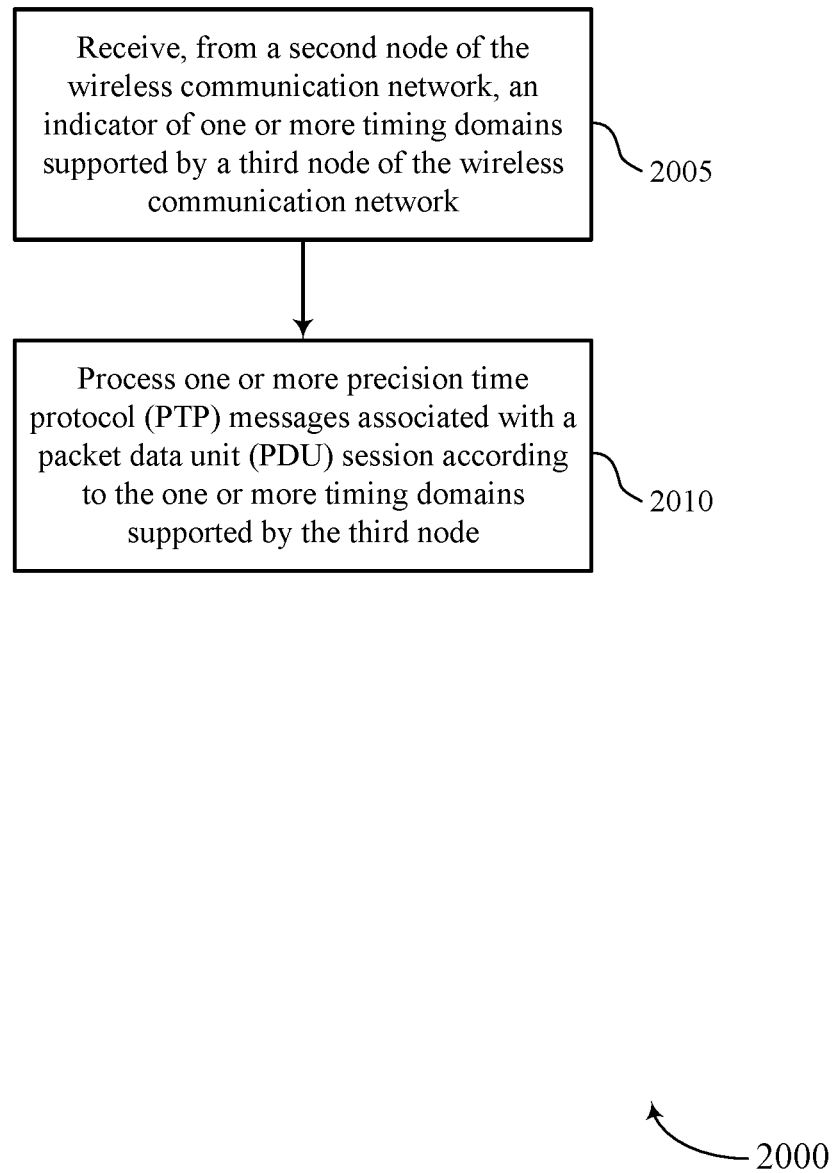

FIG. 20 shows a flowchart illustrating a method 2000 that supports wireless communication system enhancements for transparent and boundary clocks in accordance with aspects of the present disclosure. The operations of method 2000 may be implemented by a UE 115, a UPF, or associated components as described herein. For example, the operations of method 2000 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 2005, the UE or UPF may receive, from a second node of the wireless communication network, an indicator of one or more timing domains supported by a third node of the wireless communication network. In some examples, the second node and the third node may be a same node. The operations of 2005 may be performed according to the methods described herein. In some examples, aspects of the operations of 2005 may be performed by a receiver as described with reference to FIGS. 7 through 10.

At 2010, the UE or UPF may process one or more PTP messages associated with a PDU session according to the one or more timing domains supported by the third node. For example, the first node may distribute PTP messages according to supported timing domains. That is, the first node may receive indications of supported timing domains from multiple nodes, and distribute received PTP messages according to the indications of supported timing domains (e.g., distributing PTP message associated with a given timing domain to nodes that support the given timing domain). The operations of 2010 may be performed according to the methods described herein. In some examples, aspects of the operations of 2010 may be performed by a receiver as described with reference to FIGS. 7 through 10.

Figure 21:
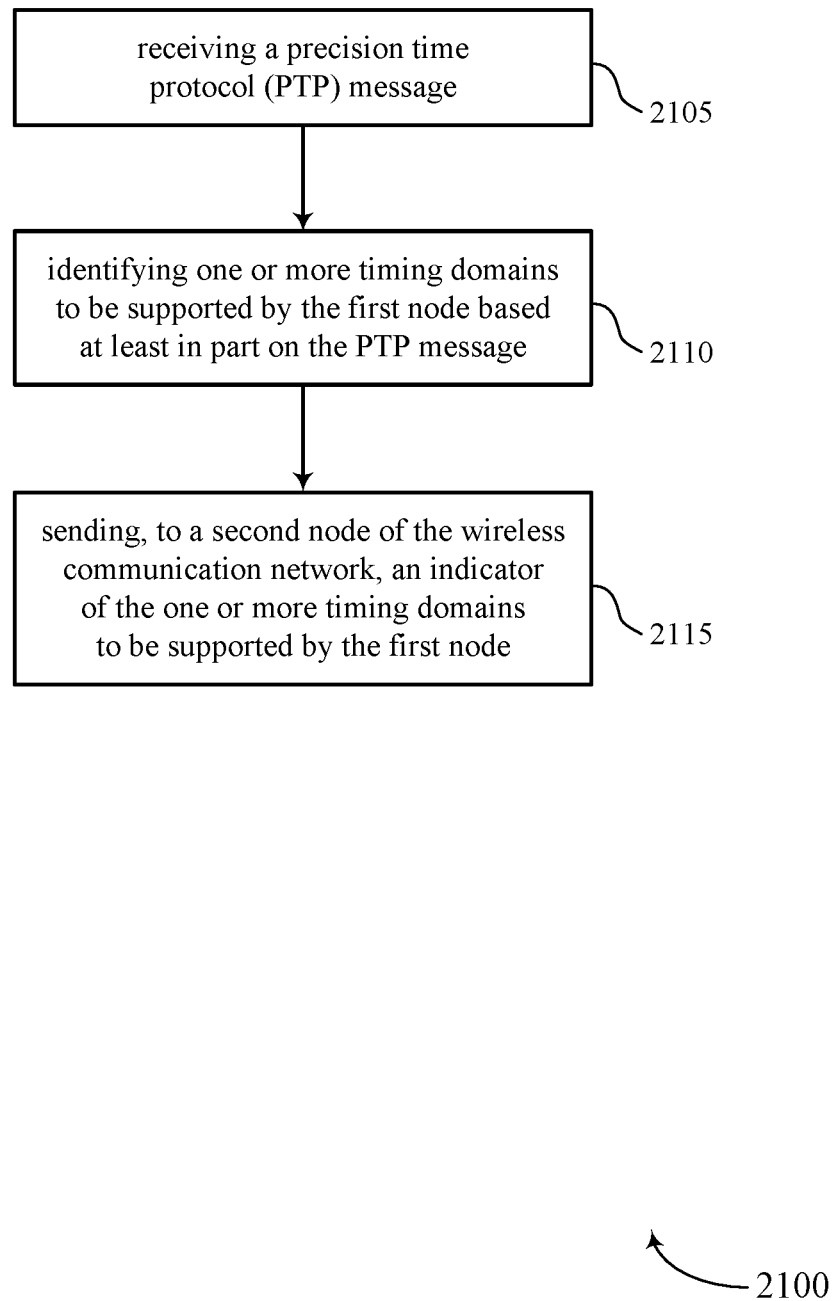

FIG. 21 shows a flowchart illustrating a method 2100 that supports wireless communication system enhancements for transparent and boundary clocks in accordance with aspects of the present disclosure. The operations of method 2100 may be implemented by a UE 115, a UPF, or associated components as described herein. For example, the operations of method 2100 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 2105, the UE or UPF may receive a PTP message. The operations of 2105 may be performed according to the methods described herein. In some examples, aspects of the operations of 2105 may be performed by a receiver as described with reference to FIGS. 7 through 10.

At 2110, the UE or UPF may identify one or more timing domains to be supported by the first node based at least in part on the PTP message. The operations of 2110 may be performed according to the methods described herein. In some examples, aspects of the operations of 2110 may be performed by a receiver as described with reference to FIGS. 7 through 10. In some examples, identifying the one or more timing domains further includes identifying a network tag in a frame associated with the PTP message. In other examples, identifying the one or more timing domains further includes determining the one or more timing domains from a field in a header of the PTP.

At 2115, the UE or UPF may send, to a second node of the wireless communication network, an indicator of the one or more timing domains to be supported by the first node. The operations of 2115 may be performed according to the methods described herein. In some examples, aspects of the operations of 2115 may be performed by a receiver as described with reference to FIGS. 7 through 10. In some examples, the second node is one of a UPF, an adaptor connected to a UPF, or a translator connected to a UPF In some examples, method 1200 may further include identifying a network tag in a frame associated with the PTP message, wherein identifying the one or more timing domains to be supported by the first node is further based at least in part on the network tag. In another example, method 1200 further includes removing a timing domain from the one or more timing domains based at least in part on a duration between PTP messages associated with the timing domain satisfying a threshold. In another example, method 1200 includes sending, to the second node, an updated indicator of the one or more timing domains excluding the timing domain.

Figure 22:
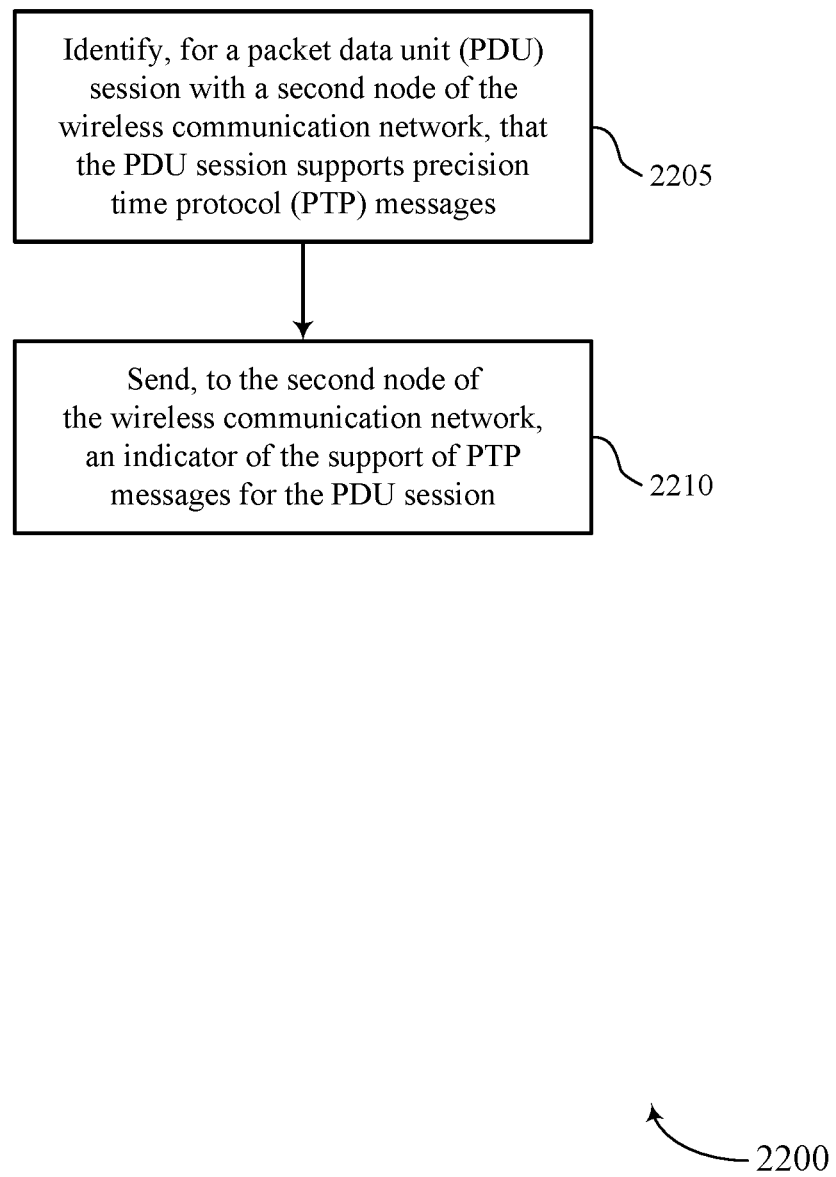

FIG. 22 shows a flowchart illustrating a method 2200 that supports wireless communication system enhancements for transparent and boundary clocks in accordance with aspects of the present disclosure. The operations of method 2200 may be implemented by a UE 115, a UPF, or associated components as described herein. For example, the operations of method 2200 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 2205, the UE or UPF may identify, for a PDU session with a second node of the wireless communication network, that the PDU session supports PTP messages. The operations of 2205 may be performed according to the methods described herein. In some examples, aspects of the operations of 2205 may be performed by a receiver as described with reference to FIGS. 7 through 10.

At 2210, the UE or UPF may send, to the second node of the wireless communication network, an indicator of the support of PTP messages for the PDU session. In some examples, the indicator is included in an information element of a PDU. The operations of 2210 may be performed according to the methods described herein. In some examples, aspects of the operations of 2205 may be performed by a receiver as described with reference to FIGS. 7 through 10.

In some examples, the first node is one of a UE, a UPF, or an adaptor connected to a UE or a UPF. In some examples, the second node is one of a UE, a UPF, or an adaptor connected to a UE or a UPF. The method 2200 may further comprise receiving a message from a third node and determining that the PDU session supports PTP messages based at least in part on the message from the third node. In some examples, the message from the third node indicates subscription information associated with the second node.

Figure 23:
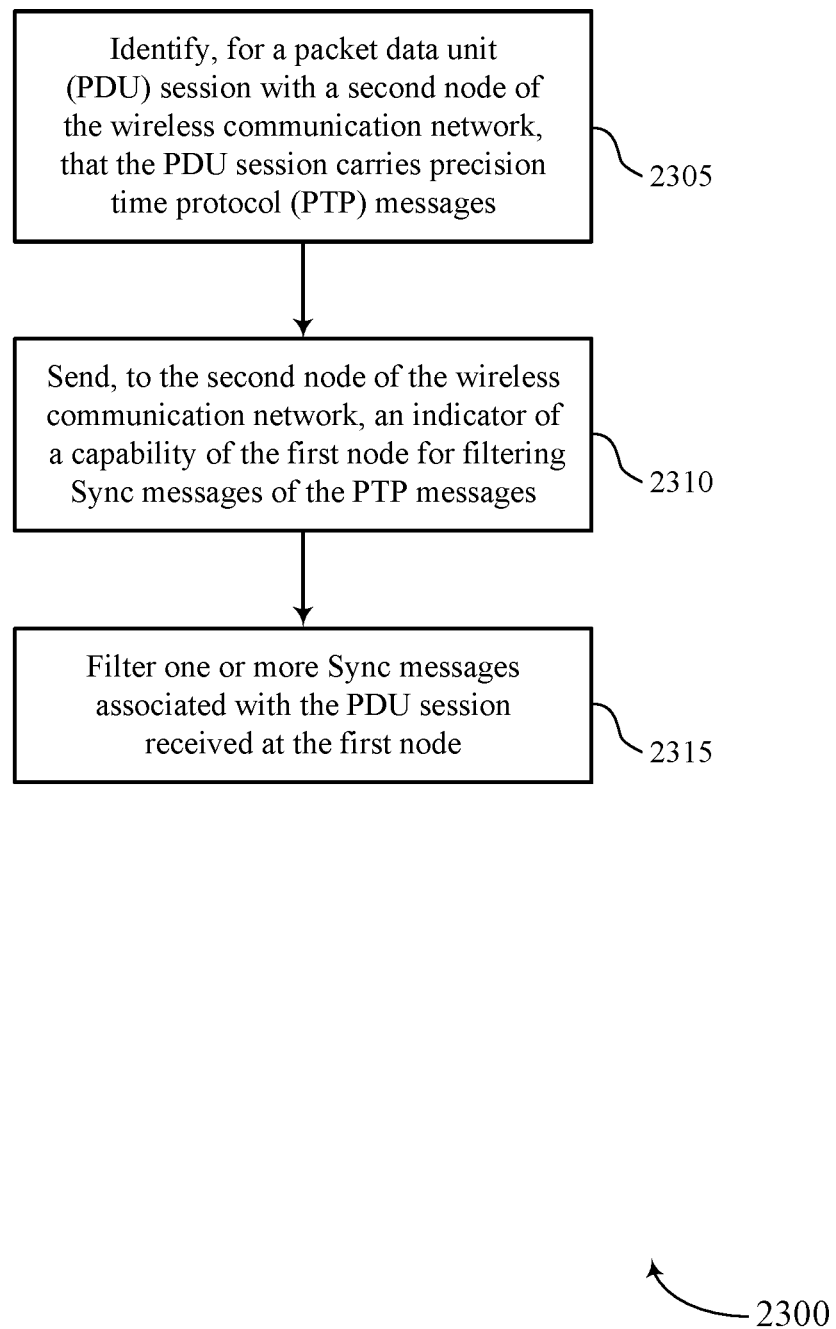

FIG. 23 shows a flowchart illustrating a method 2300 that supports wireless communication system enhancements for transparent and boundary clocks in accordance with aspects of the present disclosure. The operations of method 2300 may be implemented by a UE 115 or base station 105 or its components as described herein. For example, the operations of method 2300 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 2305, the UE or UPF may identify, for a PDU session with a second node of the wireless communication network, that the PDU session carries PTP messages. The operations of 2305 may be performed according to the methods described herein. In some examples, aspects of the operations of 2305 may be performed by a receiver as described with reference to FIGS. 7 through 10.

At 2310, the UE or UPF may send, to the second node of the wireless communication network, an indicator of a capability of the first node for filtering Sync messages of the PTP messages. In some examples, the indicator is included in an information element of a PDU. The information element may be a new field associated with the PDU. The operations of 2310 may be performed according to the methods described herein. In some examples, aspects of the operations of 2310 may be performed by a receiver as described with reference to FIGS. 7 through 10.

At 2315, the UE or UPF may filter one or more Sync messages associated with the PDU session received at the first node. The operations of 2315 may be performed according to the methods described herein. In some examples, aspects of the operations of 2315 may be performed by a receiver as described with reference to FIGS. 7 through 10.

Figure 24:
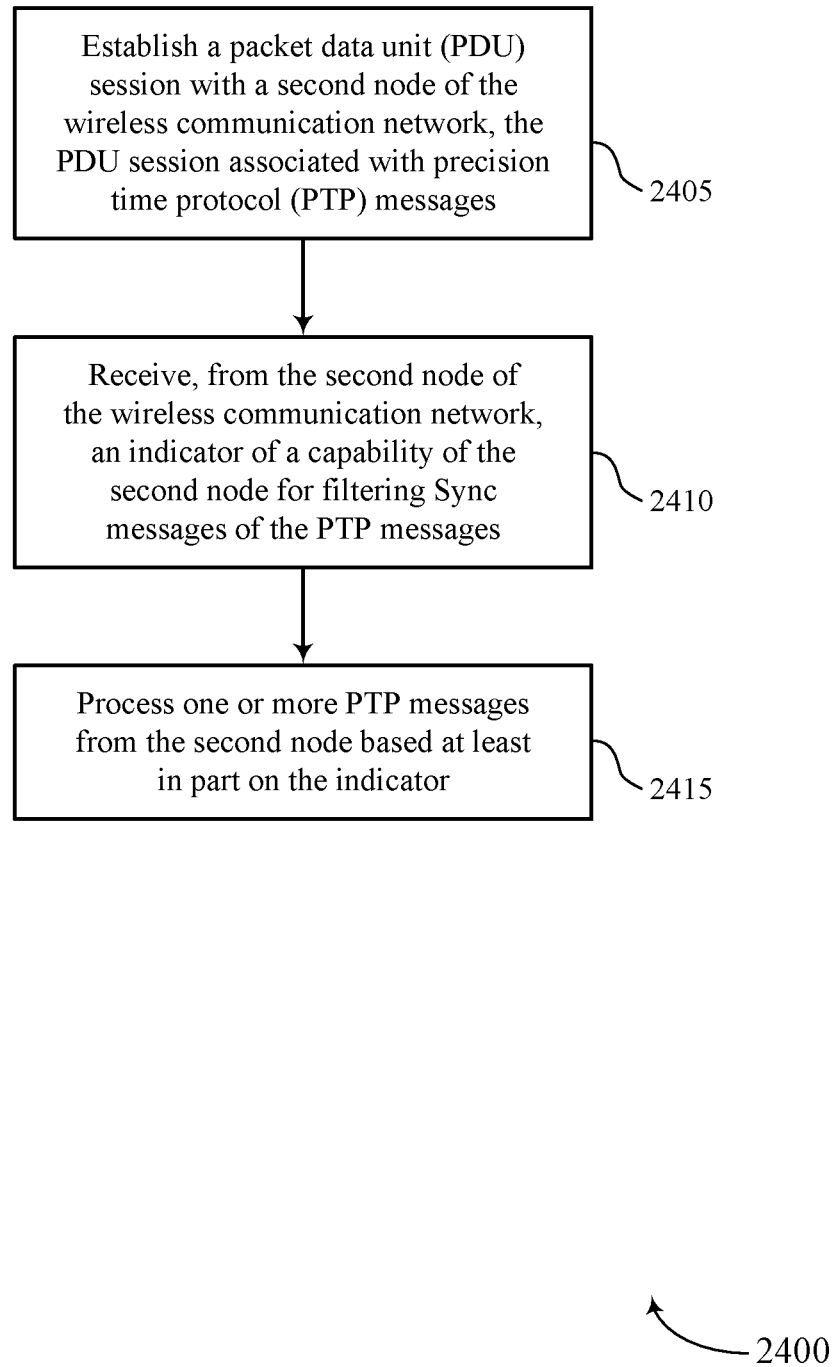

FIG. 24 shows a flowchart illustrating a method 2400 that supports wireless communication system enhancements for transparent and boundary clocks in accordance with aspects of the present disclosure. The operations of method 2400 may be implemented by a UE 115 or base station 105 or its components as described herein. For example, the operations of method 2400 may be performed by a communications manager as described with reference to FIGS. 2 and 4-10. In some examples, a UE or UPF may execute a set of instructions to control the functional elements of the UE or UPF to perform the functions described below. Additionally or alternatively, a UE or UPF may perform aspects of the functions described below using special-purpose hardware.

At 2405, the UE or UPF may establish a PDU session with a second node of the wireless communication network, the PDU session associated with PTP messages. The operations of 2405 may be performed according to the methods described herein. In some examples, aspects of the operations of 2405 may be performed by a receiver as described with reference to FIGS. 7 through 10.

At 2410, the UE or UPF may receive, from the second node of the wireless communication network, an indicator of a capability of the second node for filtering Sync messages of the PTP messages. In some examples, the indicator is included in an information element of a PDU. The information element may be a new field associated with the PDU. The operations of 2410 may be performed according to the methods described herein. In some examples, aspects of the operations of 2410 may be performed by a receiver as described with reference to FIGS. 7 through 10.

At 2415, the UE or UPF may process one or more PTP messages from the second node based at least in part on the indicator. The operations of 2415 may be performed according to the methods described herein. In some examples, aspects of the operations of 2415 may be performed by a receiver as described with reference to FIGS. 7 through 10.

Figure 25:
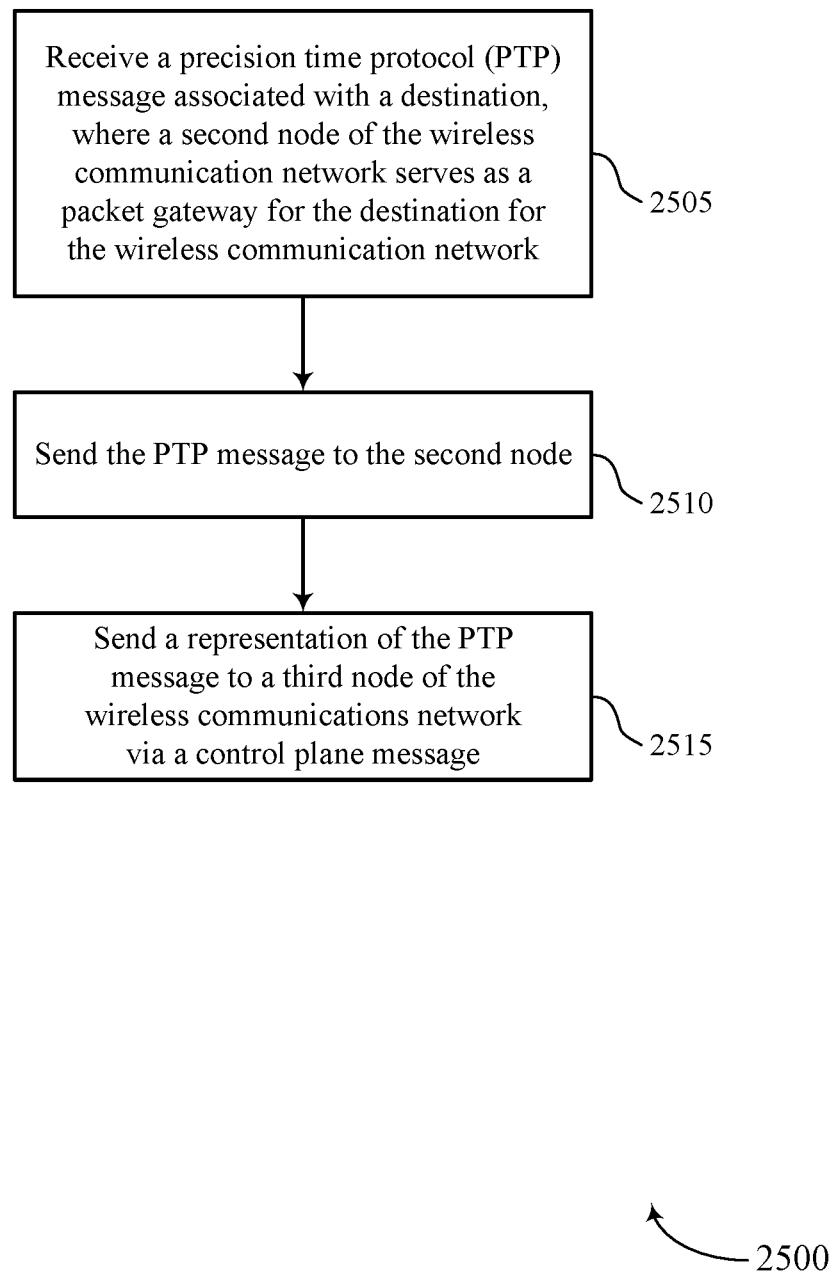

FIG. 25 shows a flowchart illustrating a method 2500 that supports wireless communication system enhancements for transparent and boundary clocks in accordance with aspects of the present disclosure. The operations of method 2500 may be implemented by a UE 115 or base station 105 or its components as described herein. For example, the operations of method 2500 may be performed by a communications manager as described with reference to FIGS. 2 and 4-10. In some examples, a UE or base station may execute a set of instructions to control the functional elements of the UE or base station to perform the functions described below. Additionally or alternatively, a UE or base station may perform aspects of the functions described below using special-purpose hardware.

At 2505, the first node may receive a PTP message associated with a destination, where a second node of the wireless communication network serves as a packet gateway for the destination for the wireless communication network. For example, the second node may be a UPF. The operations of 2505 may be performed according to the methods described herein. In some examples, aspects of the operations of 2505 may be performed by a receiver as described with reference to FIGS. 2 and 4-10.

At 2510, the first node may send the PTP message to the second node. The operations of 2510 may be performed according to the methods described herein. In some examples, aspects of the operations of 2510 may be performed by a transmitter as described with reference to FIGS. 2 and 4-10.

At 2515, the first node may send a representation of the PTP message to a third node of the wireless communications network. The first node may send the representation of the PTP message via a user plane message or a control plane message. For example, the first node may forward the PTP message to the third node. The operations of 2515 may be performed according to the methods described herein. In some examples, aspects of the operations of 2515 may be performed by a transmitter as described with reference to FIGS. 2 and 4-10.

In some examples, the third node may be one of an AMF, a UPF, or a base station. In some examples, the third node may be the same node as the second node.

Figure 26:
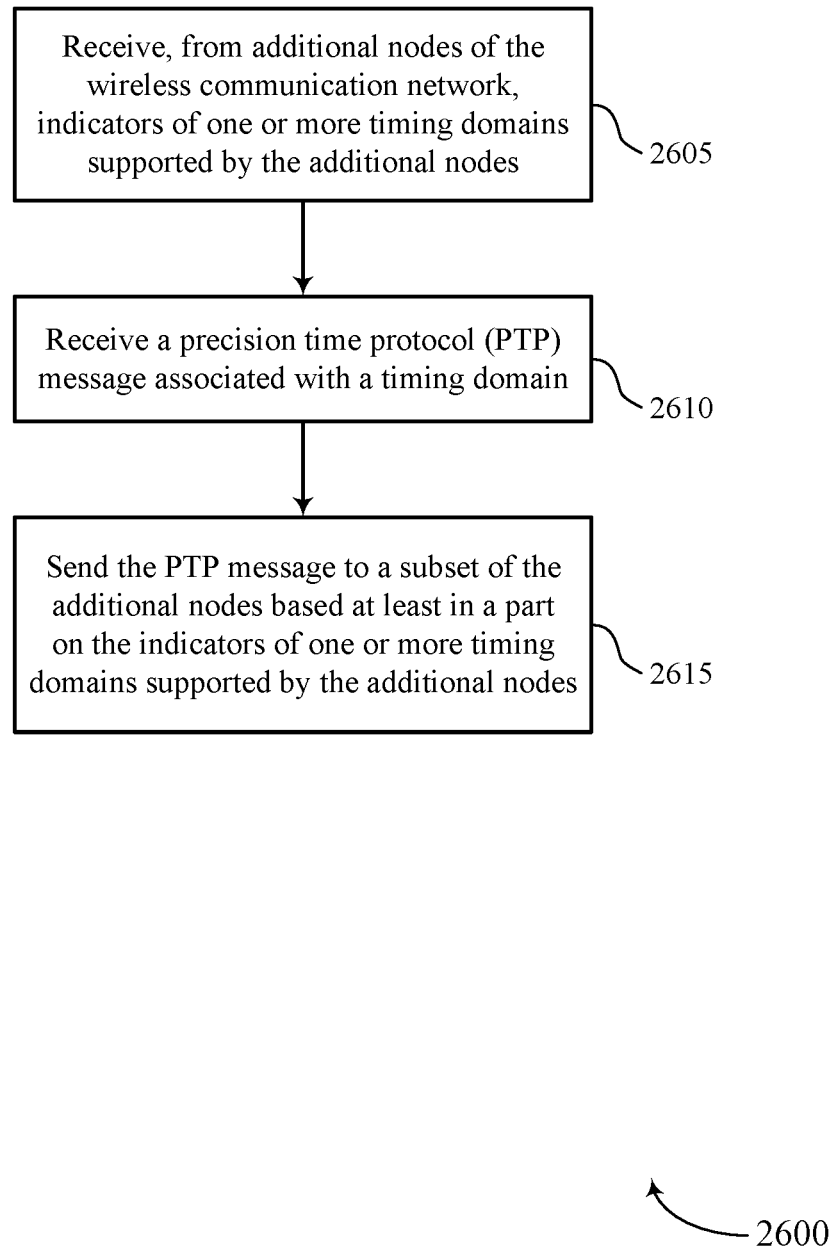

FIG. 26 shows a flowchart illustrating a method 2600 that supports wireless communication system enhancements for transparent and boundary clocks in accordance with aspects of the present disclosure. The operations of method 2600 may be implemented by a node, such as a UE 115 or base station 105 or its components as described herein. For example, the operations of method 2600 may be performed by a communications manager as described with reference to FIGS. 2 and 4-10. In some examples, a node may execute a set of instructions to control the functional elements of the node to perform the functions described below. Additionally or alternatively, a node may perform aspects of the functions described below using special-purpose hardware.

At 2605, the node may receive, from additional nodes of the wireless communication network, indicators of one or more timing domains supported by the additional nodes. The operations of 2605 may be performed according to the methods described herein. In some examples, aspects of the operations of 2605 may be performed by a receiver as described with reference to FIGS. 2 and 4-10. In some examples, the one or more additional nodes are UEs.

At 2610, the node may receive a PTP message associated with a timing domain. The operations of 2610 may be performed according to the methods described herein. In some examples, aspects of the operations of 2610 may be performed by a receiver as described with reference to FIGS. 2 and 4-10.

At 2615, the node may send the PTP message to a subset of the additional nodes based at least in a part on the indicators of one or more timing domains supported by the additional nodes. The operations of 2615 may be performed according to the methods described herein. In some examples, aspects of the operations of 2615 may be performed by a transmitter as described with reference to FIGS. 2 and 4-10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication networks such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication networks described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a node of a wireless communication network, comprising:
    establishing, with one or more user equipments (UEs) of the wireless communication network, a packet data unit (PDU) session for communication of messages for one or more protocols including precision time protocol (PTP) messages associated with one or more timing domains;
    receiving, at the node from a time sensitive network node, a downstream PTP message associated with a timing domain;
    adjusting, by the node, a field of the downstream PTP message based at least in part on a link delay between the time sensitive network node and the node, wherein the node comprises a user plane function (UPF); and
    sending, from the node, the downstream PTP message to the one or more UEs including an indication of the one or more timing domains associated with the established PDU session.

2. The method of claim 1, further comprising:
    receiving, at the node, one or more indicators of the one or more timing domains supported by the one or more UEs, wherein the established PDU session supports PTP messages for the one or more timing domains.

3. The method of claim 1, wherein sending the downstream PTP message to the one or more UEs comprises:
    determining that the one or more UEs support the timing domain associated with the downstream PTP message based at least in part on one or more indicators of the one or more timing domains supported by the one or more UEs indicating the timing domain, wherein sending the downstream PTP message to the one or more UEs is based at least in part on the determining.

4. The method of claim 1, further comprising:
    receiving an upstream PTP packet including one or more indicators of the one or more timing domains supported by the one or more UEs.

5. The method of claim 1, wherein the wireless communication network comprises a time sensitive network (TSN).

6. An apparatus, comprising:
    a processor; and
    a memory coupled with the processor, wherein the memory comprises instructions executable by the processor to cause the apparatus to:
        establish, with one or more user equipments (UEs) of a wireless communication network, a packet data unit (PDU) session for communication of messages for one or more protocols including precision time protocol (PTP) messages associated with one or more timing domains;
        receive, at the apparatus from a time sensitive network node, a downstream PTP message associated with a timing domain;
        adjust, by the apparatus, a field of the downstream PTP message based at least in part on a link delay between the time sensitive network node and the apparatus, wherein the apparatus comprises a user plane function (UPF); and
        send, from the apparatus, the downstream PTP message to the one or more UEs including an indication of the one or more timing domains associated with the established PDU session.

7. The apparatus of claim 6, wherein the instructions are further executable by the processor to cause the apparatus to:
    receive, at the apparatus, one or more indicators of the one or more timing domains supported by the one or more UEs, wherein the established PDU session supports PTP messages for the one or more timing domains.

8. The apparatus of claim 6, wherein the instructions to send the downstream PTP message to the one or more UEs are executable by the processor to cause the apparatus to:
    determine that the one or more UEs support the timing domain associated with the downstream PTP message based at least in part on one or more indicators of the one or more timing domains supported by the one or more UEs indicating the timing domain, wherein sending the downstream PTP message to the one or more UEs is based at least in part on the determining.

9. The apparatus of claim 6, wherein the instructions are further executable by the processor to cause the apparatus to:
    receive an upstream PTP packet including one or more indicators of the one or more timing domains supported by the one or more UEs.

10. The apparatus of claim 6, wherein the wireless communication network comprises a time sensitive network (TSN).

11. An apparatus, comprising:
    means for establishing, with one or more user equipments (UEs) of a wireless communication network, a packet data unit (PDU) session for communication of messages for one or more protocols including precision time protocol (PTP) messages associated with one or more timing domains;

means for receiving, at the apparatus from a time sensitive network node, a downstream PTP message associated with a timing domain;

means for adjusting, by the apparatus, a field of the downstream PTP message based at least in part on a link delay between the time sensitive network node and the apparatus, wherein the apparatus comprises a user plane function (UPF); and means for sending, from the apparatus, the downstream PTP message to the one or more UEs including an indication of the one or more timing domains associated with the established PDU session.

12. The apparatus of claim 11, further comprising:

means for receiving, at the apparatus, one or more indicators of the one or more timing domains supported by the one or more UEs, wherein the established PDU session supports PTP messages for the one or more timing domains.

13. The apparatus of claim 11, wherein the means for sending the downstream PTP message to the one or more UEs comprise:

means for determining that the one or more UEs support the timing domain associated with the downstream PTP message based at least in part on one or more indicators of the one or more timing domains supported by the one or more UEs indicating the timing domain, wherein sending the downstream PTP message to the one or more UEs is based at least in part on the determining.

14. The apparatus of claim 11, further comprising:

means for receiving an upstream PTP packet including one or more indicators of the one or more timing domains supported by the one or more UEs.

15. A non-transitory computer-readable medium storing code, the code comprising instructions executable by a processor to:

establish with one or more user equipments (UEs) of a wireless communication network, a packet data unit (PDU) session for communication of messages for one or more protocols including precision time protocol (PTP) messages associated with one or more timing domains;

receive, from a time sensitive network node, a downstream PTP message associated with a timing domain;

adjust, by a node, a field of the downstream PTP message based at least in part on a link delay between the time sensitive network node and the node, wherein the node comprises a user plane function (UPF); and send the downstream PTP message to the one or more UEs including an indication of the one or more timing domains associated with the established PDU session.

16. The method of claim 4, wherein the one or more indicators of the one or more timing domains supported by the one or more UEs comprise a virtual local area network tag associated with the upstream PTP packet.

17. The method of claim 4, wherein the one or more indicators of the one or more timing domains supported by the one or more UEs comprise a domain number included in a header associated with the upstream PTP packet.

18. The apparatus of claim 9, wherein the one or more indicators of the one or more timing domains supported by the one or more UEs comprise a virtual local area network tag associated with the upstream PTP packet.

19. The apparatus of claim 9, wherein the one or more indicators of the one or more timing domains supported by the one or more UEs comprise a domain number included in a header associated with the upstream PTP packet.

20. The apparatus of claim 14, wherein the one or more indicators of the one or more timing domains supported by the one or more UEs comprise a virtual local area network tag associated with the upstream PTP packet.

21. The apparatus of claim 14, wherein the one or more indicators of the one or more timing domains supported by the one or more UEs comprise a domain number included in a header associated with the upstream PTP packet.

* * * * *